(12) United States Patent
Kobayashi et al.

(10) Patent No.: US 9,895,664 B2
(45) Date of Patent: Feb. 20, 2018

(54) CARTRIDGE TYPE HOLLOW FIBER MEMBRANE MODULE

(71) Applicant: TORAY INDUSTRIES, INC., Tokyo (JP)

(72) Inventors: Atsushi Kobayashi, Shiga (JP); Hayato Inuzuka, Shiga (JP); Shun Shimura, Shiga (JP); Norihiro Takeuchi, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 153 days.

(21) Appl. No.: 14/786,932

(22) PCT Filed: Apr. 24, 2014

(86) PCT No.: PCT/JP2014/061641
§ 371 (c)(1),
(2) Date: Oct. 23, 2015

(87) PCT Pub. No.: WO2014/175409
PCT Pub. Date: Oct. 30, 2014

(65) Prior Publication Data
US 2016/0107125 A1    Apr. 21, 2016

(30) Foreign Application Priority Data

Apr. 25, 2013 (JP) ................. 2013-092701

(51) Int. Cl.
*B01D 63/02* (2006.01)
*B01D 63/04* (2006.01)
*C02F 1/44* (2006.01)

(52) U.S. Cl.
CPC ............. *B01D 63/04* (2013.01); *B01D 63/02* (2013.01); *B01D 2313/02* (2013.01);
(Continued)

(58) Field of Classification Search
None
See application file for complete search history.

(56) References Cited

U.S. PATENT DOCUMENTS 4,315,819 A    2/1982  King et al.
4,610,789 A *  9/1986  Barch ................ B01D 63/024
                                                    210/321.87

(Continued)

FOREIGN PATENT DOCUMENTS

CA    1114308 A    12/1981
CN    1747903 A    3/2006

(Continued)

OTHER PUBLICATIONS

International Search Report, issued in PCT/JP2014/061641, dated Jun. 24, 2014.

(Continued)

*Primary Examiner* — Krishnan S Menon
(74) *Attorney, Agent, or Firm* — Birch, Stewart, Kolasch & Birch, LLP

(57) ABSTRACT

A cartridge type hollow-fiber membrane module of the present invention includes: a housing; a plurality of hollow fiber membranes housed in the housing; a first potting part which bundles first ends of the hollow fiber membranes while keeping the first ends open; a second potting part which bundles second ends of the hollow fiber membranes while keeping the second ends sealed; a fixing part which detachably fixes the first potting part to the housing; a sealing part which liquid-tightly seals a space between the first potting part and the housing; and a holding part which holds the second potting part so that the second potting part is detachable from the housing and so that liquids can pass through a space between the second potting part and the housing.

11 Claims, 21 Drawing Sheets

(52) U.S. Cl.
CPC ...... *B01D 2313/04* (2013.01); *B01D 2313/08* (2013.01); *B01D 2315/08* (2013.01); *C02F 1/44* (2013.01)

(56) References Cited

U.S. PATENT DOCUMENTS

| | | | |
|---|---|---|---|
| 7,118,672 | B2 | 10/2006 | Husain et al. |
| 7,122,121 | B1 | 10/2006 | Ji |
| 7,520,159 | B2 | 4/2009 | Paakkanen et al. |
| 7,534,349 | B2 | 5/2009 | Collins et al. |
| 8,343,347 | B2 | 1/2013 | Collins et al. |
| 8,557,115 | B2 | 10/2013 | Collins et al. |
| 2004/0045893 | A1* | 3/2004 | Watanabe ............ B01D 63/022 210/321.79 |
| 2004/0211723 | A1 | 10/2004 | Husain et al. |
| 2006/0113235 | A1* | 6/2006 | Strohm ................. B01D 63/02 210/232 |
| 2007/0039868 | A1 | 2/2007 | Ishibashi |
| 2007/0163943 | A1 | 7/2007 | Collins et al. |
| 2007/0256474 | A1 | 11/2007 | Paakkanen et al. |
| 2009/0283460 | A1 | 11/2009 | Collins et al. |
| 2012/0261315 | A1 | 10/2012 | Collins et al. |

FOREIGN PATENT DOCUMENTS

| | | |
|---|---|---|
| CN | 1910453 A | 2/2007 |
| CN | 101300062 A | 11/2008 |
| JP | 64-30605 A | 2/1989 |
| JP | 2-121122 U | 10/1990 |
| JP | 2001-62532 A | 3/2001 |
| JP | 3236103 B2 | 12/2001 |
| JP | 2003-164735 A | 6/2003 |
| JP | 2007-252367 A | 10/2007 |
| JP | 2008-237101 A | 10/2008 |
| JP | 2009-18266 A | 1/2009 |
| JP | 2012-161288 A | 8/2012 |
| KR | 10-1206292 B1 | 11/2012 |
| WO | WO 02/04101 A1 | 1/2002 |
| WO | WO 2012/043679 A1 | 4/2012 |
| WO | WO 2012/083390 A2 | 6/2012 |

OTHER PUBLICATIONS

Written Opinion of the International Searching Authority, issued in PCT/JP2014/061641, dated Jun. 24, 2014.
Chinese Office Action and Search Report, dated Jul. 19, 2016, for Chinese Application No. 201480023400.2, together with an English translation thereof.
Chinese Office Action and Search Report issued in Chinese Application No. 201480023400.2, dated Apr. 7, 2017.
Extended European Search Report issued in European Application No. 14788883.8, dated Mar. 10, 2017.
Singaporean Office Action and Search Report, dated Oct. 31, 2016, for Singaporean Application No. 11201508777R.

* cited by examiner

CARTRIDGE TYPE HOLLOW FIBER MEMBRANE MODULE

TECHNICAL FIELD

The present invention related to a cartridge type hollow-fiber membrane module for use in the fields of water treatment, fermentation industry, production of medicines, food industry, etc.

BACKGROUND ART

Fermentation methods which are methods for substance production involving incubation of microorganisms or cells to be incubated can be roughly classified into: (1) a batch fermentation method and a fed-batch fermentation method; and (2) a continuous fermentation method.

In relation to the continuous fermentation method (2), a method has been proposed in which the microorganism or incubated cells are filtrated off with a separation membrane to recover a chemical from the filtrated liquid and, at the same time, the microorganism or incubated cells in the concentrated liquid are caused to be held in or are returned to the culture medium, thereby keeping the concentration of the microorganism or incubated cells in the culture medium high.

For example, a technique has been proposed in which continuous fermentation is performed in a continuous fermentation apparatus employing, as the separation membranes, flat sheet membranes made of an organic polymer (see Patent Document 1). Although the technique of Patent Document 1 is effective in continuous fermentation, the effective membrane area relative to the volume in which the flat-sheet membrane units have been installed is small. Consequently, production of a target chemical by this technique does not have a sufficient cost merit, and there has been room for investigation from the standpoint of heightening the efficiency.

In order to overcome the above-mentioned problem, a technique of continuous fermentation has been proposed in which hollow fiber membranes made of an organic polymer are used as separation membranes in a continuous fermentation apparatus (see Patent Document 2). In this technique, each membrane unit can have a large membrane area per unit volume and, hence, a remarkably heightened efficiency of fermentative production has been attained as compared with conventional continuous fermentation.

Known as a separation membrane module employing hollow fiber membranes is an integrated module which includes a cylindrical case and, housed therein, a bundle of a large number of hollow fiber membranes and in which both ends of the bundle of hollow fiber membranes have been fixed to the cylindrical case with an adhesive so that the end faces of the hollow fiber membranes in at least one end of the bundle are open. In fields where steam sterilization is necessary, such as the fermentation field, cartridge type modules in which cartridges are used in the state of having been disposed in cylindrical cases are frequently used in order to reduce the cost of modules. With respect to configurations of cartridge type hollow-fiber membrane modules, a module has been proposed in which one-side ends of hollow fiber membranes are held in a cylindrical case and the other-side ends are not held in the cylindrical case (see Patent Document 3).

BACKGROUND ART DOCUMENT

Patent Document

Patent Document 1: JP-A-2007-252367
Patent Document 2: JP-A-2008-237101
Patent Document 3: JP-A-2012-161288

SUMMARY OF THE INVENTION

Problems that the Invention is to Solve

However, in hollow-fiber membrane modules having such a structure, there have been cases where the hollow fiber membranes are lifted up by the flow of a fluid during cross flow filtration or during air scrubbing and are thereby bent and damaged. In cross flow filtration or air scrubbing, a fluid is caused to flow generally from below the module upward. Because of this, stress occurs due to the flow, resulting in force which pushes up the potting part or hollow fiber membranes located in a lower part of the module. If the lower ends of the hollow fiber membranes in this module are not held by the cylindrical case, there have been cases where the hollow fiber membranes are lifted up and are bent and damaged.

Meanwhile, in the case of using a hollow-fiber membrane module in applications such as fermentation, steam sterilization is necessary for preventing contamination with various bacteria. Normal conditions of the steam sterilization include 121° C. for 20 minutes, and a decrease in temperature requires a considerably longer period for ensuring sterilizability. It is therefore important to maintain a temperature of 121° C. or higher. In case where air stagnation or steam drain stagnation occurs in the module during steam sterilization, a failure in temperature rising occurs and this may make it impossible to ensure sterilizability. Since air is prone to stagnate in upward dead-end spaces and steam drain is prone to stagnate in downward dead-end spaces, it is preferred to eliminate such stagnation spaces as much as possible.

The present invention has been achieved in view of those circumstances, and an object thereof is to provide a cartridge type hollow-fiber membrane module in which the hollow fiber membranes are inhibited from being lifted up during cross flow filtration or during air scrubbing and in which steam sterilizability is ensured.

Means for Solving the Problems

In order to solve the above-described problem, the present invention has the following configurations (1) to (10).

(1) A cartridge type hollow-fiber membrane module including: a housing; a plurality of hollow fiber membranes housed in the housing; a first potting part which bundles first ends of the hollow fiber membranes while keeping the first ends open; a second potting part which bundles second ends of the hollow fiber membranes while keeping the second ends sealed; a fixing part which detachably fixes the first potting part to the housing; a sealing part which liquid-tightly seals a space between the first potting part and the housing; and a holding part which holds the second potting part so that the second potting part is detachable from the housing and so that liquids can pass through a space between the second potting part and the housing, in which a gap is provided between the second potting part and the housing, the second potting part is movable in a radial direction and an axial direction of the housing, and the holding part restricts a movement of the second potting part in the axial direction of the housing.

(2) The cartridge type hollow-fiber membrane module according to (1), in which at least one first holding groove is provided to the housing in a position which faces an outer peripheral surface of the second potting part, at least one second holding groove is provided to the outer peripheral surface of the second potting part in a position which faces the first holding groove, and the holding part is a pin, and the pin is inserted into both the first holding groove and the second holding groove.

(3) The cartridge type hollow-fiber membrane module according to (1), in which a first holding groove is provided to the housing in a position which faces the outer peripheral surface of the second potting part, a second holding groove is provided to the outer peripheral surface of the second potting part in a position which faces the first holding groove, and the holding part is a ring-shaped member having at least one notch, and the ring-shaped member is inserted into both the first holding groove and the second holding groove.

(4) The cartridge type hollow-fiber membrane module according to (1), in which at least one holding groove is provided to the housing in a position which faces the outer peripheral surface of the second potting part, or provided to the second potting part in a position which faces an inner peripheral surface of the housing, in a case where the housing has the holding groove, the holding part is provided to the second potting part in a position which faces the holding groove, in a case where the second potting part has the holding groove, the holding part is provided to the housing in a position which faces the holding groove, and the holding part is a pin, and the pin is inserted into the holding groove.

(5) The cartridge type hollow-fiber membrane module according to (2) or (3), in which when the second potting part is moved in a direction opposite from the first potting part, the holding part is in line contact with both the first holding groove and the second holding groove to thereby hold the second potting part.

(6) The cartridge type hollow-fiber membrane module according to (4), in which when the second potting part is moved in the direction opposite from the first potting part, the holding part is in line contact with the holding groove to thereby hold the second potting part.

(7) The cartridge type hollow-fiber membrane module according to (1), in which the housing is equipped with at least one first fastener, the second potting part is equipped with at least one second fastener, and the holding part is a stringy member, and the stringy member connects the first fastener and the second fastener to each other.

(8) The cartridge type hollow-fiber membrane module according to any one of (1) to (7), in which the second potting part has one or more through holes which pierce the second potting part in the axial direction of the housing, and an opening of at least one through hole among the through holes on a surface of the second potting part which faces the first potting part is located in a region which ranges within a height of 3 mm from the lowest portion of the surface.

(9) The cartridge type hollow-fiber membrane module according to any one of (1) to (8), in which the second potting part has one or more through holes which pierce the second potting part in the axial direction of the housing, and a sum of a channel area of the through holes and a channel area of the gap between the second potting part and the housing is 5 to 30% of a cross-sectional area of the housing.

(10) The cartridge type hollow-fiber membrane module according to any one of (1) to (9), which is equipped with a flow regulation cylinder below the first potting part, in which a gap is provided between a lower end of the flow regulation cylinder and the housing.

Advantages of the Invention

The cartridge type hollow-fiber membrane module of the present invention has an effect in which the hollow fiber membranes are inhibited from being lifted up during cross flow filtration or during air scrubbing and the hollow fiber membranes are inhibited from being damaged. Furthermore, the cartridge type hollow-fiber membrane module of the present invention can retain steam sterilizability.

MODE FOR CARRYING OUT THE INVENTION

Figure 1:
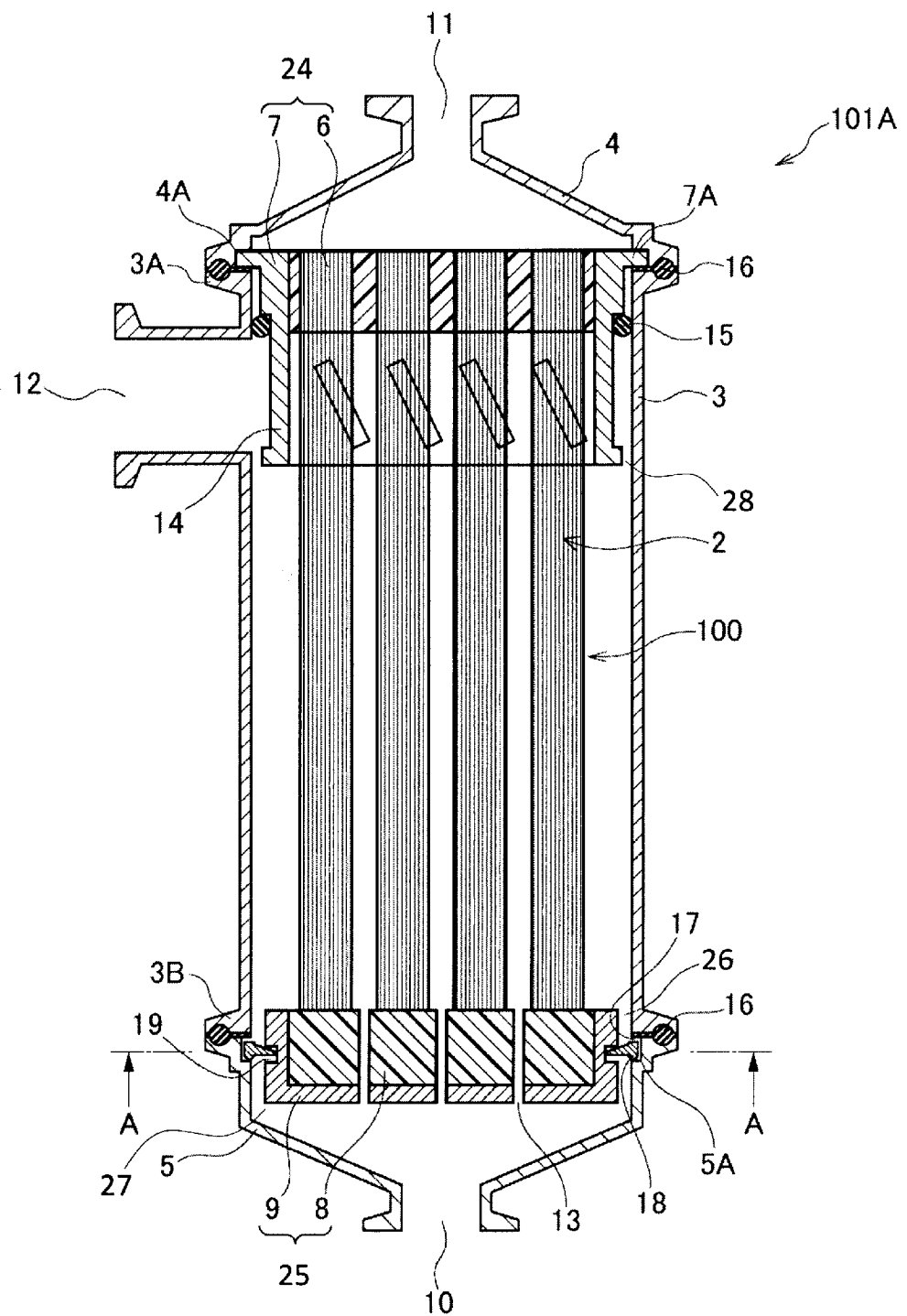
FIG. 1 is a diagrammatic vertical sectional view of a cartridge type hollow-fiber membrane module according to a first embodiment of the invention.

Cartridge type hollow-fiber membrane modules according to embodiments of the invention are explained below in detail on the basis of drawings. In the invention, "upside" and "downside" are terms used for reasons of convenience on the basis of the state shown in the drawings; the side into which raw water flows is referred to as "downside" direction, and the side form which a filtrated liquid flows out is referred to as "upside" direction. Usually, the upside and downside directions for the hollow-fiber membrane module in the position during use are the same as the upside and downside directions shown in the drawings.
(First Embodiment)

Figure 2:
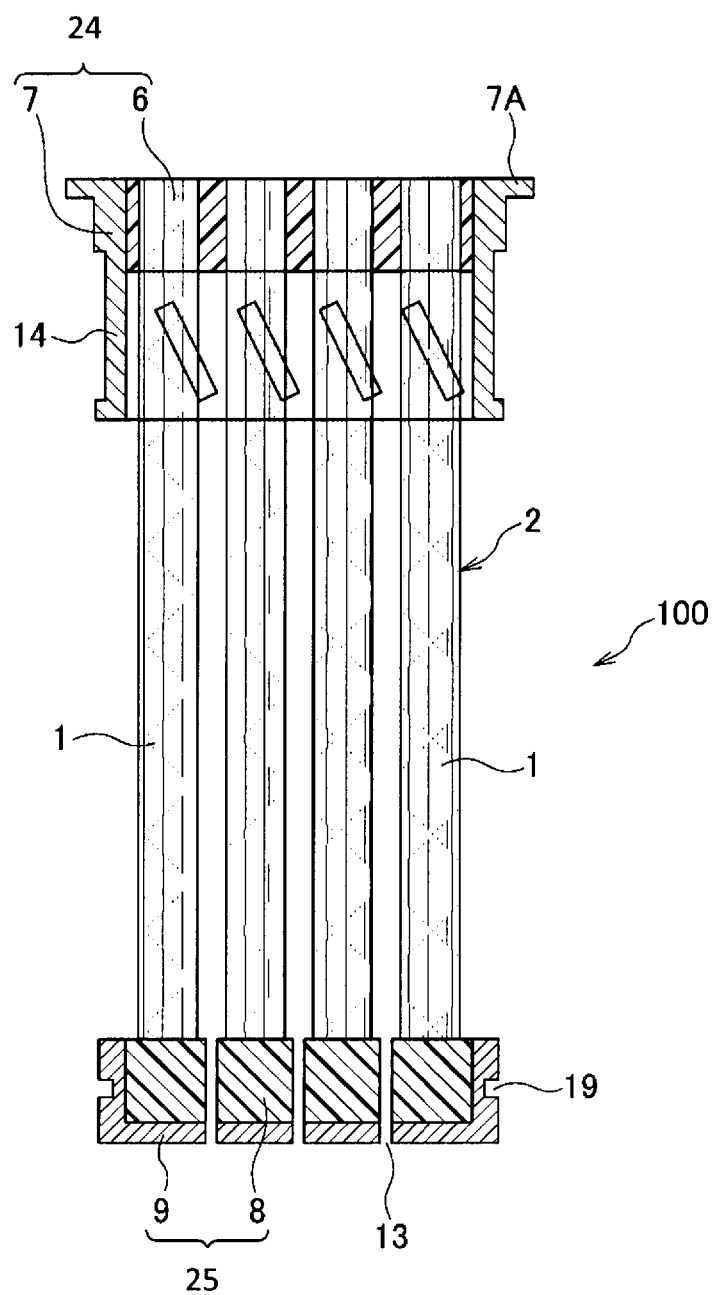
FIG. 2 is a diagrammatic sectional view of a hollow-fiber membrane cartridge.

The configuration of a cartridge type hollow-fiber membrane module 101A according to a first embodiment of the invention is explained while referring to drawings. FIG. 1 is a diagrammatic vertical sectional view of the cartridge type hollow-fiber membrane module 101A according to the first embodiment of the invention, and FIG. 2 is a diagrammatic sectional view of a hollow-fiber membrane cartridge 100.

The cartridge type hollow-fiber membrane module 101A according to the first embodiment of the invention includes a housing, a plurality of hollow fiber membranes 1 housed in the housing, a first potting part 24 which bundles first ends of the hollow fiber membranes while keeping the first ends open, a second potting part 25 which bundles second ends of the hollow fiber membranes 1 while keeping the second ends sealed, a fixing part which detachably fixes the first potting part 24 to the housing, a sealing part which liquid-tightly seals the space between the first potting part 24 and the housing, and a holding part which holds the second potting part 25 so that the second potting part 25 is detachable from the housing and so that liquids can pass through the space between the second potting part 25 and the housing.

In this module, a gap 26 extending in the radial direction and a gap 27 extending in the axial direction are provided between the second potting part 25 and the housing.

Figure 9:
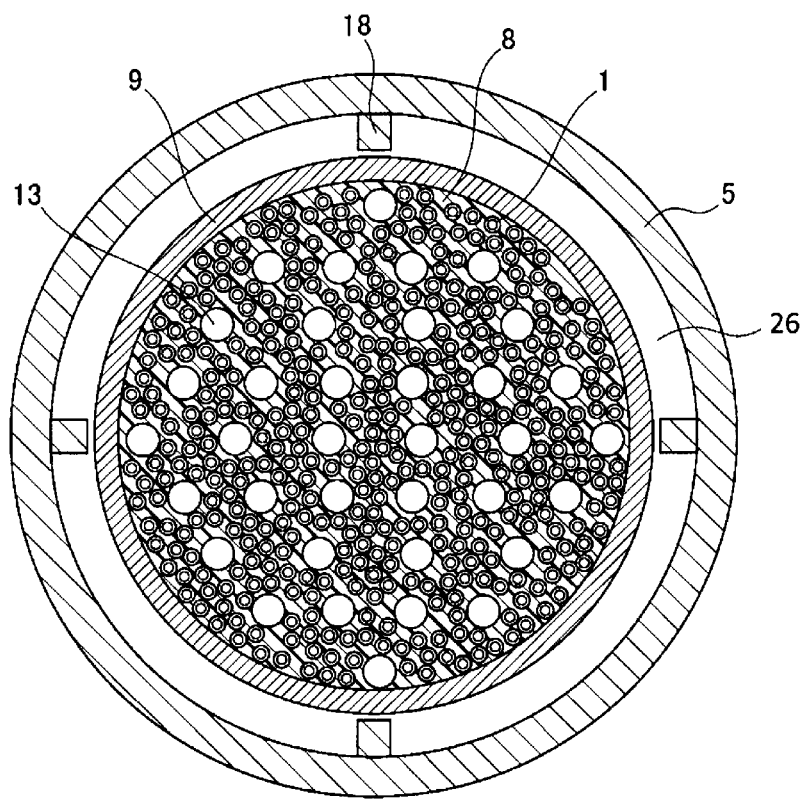
FIG. 9 is a cross-sectional view taken on the line B-B of FIG. 8.

The "axial direction" is the same as the height direction (upside/downside direction in FIG. 1) of the cylindrical case 3 shown in FIG. 1, etc. Meanwhile, the "radial direction" is the radial direction of the housing and potting parts 24 and 25. In FIG. 9, the cross-sectional shapes of a lower cap 5 and second-end case 9 are shown by circles. That "radial direction" is the same as the radial direction of the circles.

The second potting part 25 is movable in the radial direction and axial direction of the housing. However, the movement of the second potting part 25 in the axial direction of the housing is restricted by the holding part, so that the range over which the second potting part 25 is movable is restricted to a certain range. Namely, the term "holding" means that the movement of the second potting part 25 is restricted so that the second potting part 25 is in the state of being movable in a certain range. Incidentally, the movement of the second potting part 25 in the radial directions is restricted by the housing.

It is preferable that the range over which the second potting part 25 is movable in the axial direction of the housing is regulated to 0.5 mm or larger but not larger than 5% of the effective length of the hollow fiber membranes. More preferably, that range is not larger than 3% of the effective length of the hollow fiber membranes. The term "effective length of the hollow fiber membranes" herein means the length of the portion which has not been bonded with an adhesive and is capable of filtration. In case where the range over which the second potting part 25 is movable is less than 0.5 mm, the gap between the holding part and the second potting part 25 or between the holding part and the housing is so small that steam is less apt to infiltrate during steam sterilization, resulting in the concern of a sterilization failure. Such too small ranges are hence undesirable. Meanwhile, in case where the range over which the second potting part 25 is movable is larger than 5%, there is a concern that the hollow fiber membranes might be bent and damaged. Such too large ranges are hence undesirable.

The hollow-fiber membrane modules shown below as embodiments are all of the external-pressure type. The term "external-pressure type" herein means the mode of filtration in which raw water is supplied from outside the hollow fiber membranes and is filtrated while being passing toward the inner side (toward the hollow parts) of the hollow fiber membranes.
<Housing>

The housing is for disposing a hollow-fiber membrane cartridge 100 therein, and includes a hollow cylindrical case 3, and an upper cap 4 and a lower cap 5 which are provided to both ends of the cylindrical case 3.

As shown in FIG. 1, an upper cap 4 having a filtrated-liquid outlet 11 and a lower cap 5 having a raw-water inflow port 10 are liquid- and air-tightly connected respectively to an upper part and a lower part of the cylindrical case 3. Examples of methods for connecting the upper cap 4 and the lower cap 5 to the cylindrical case 3 include a method in which gaskets 16 are used and the caps are fixed with clamps or the like, as shown, for example, in FIG. 1.

The cylindrical case 3 has flanges 3A and 3B on the upper and lower ends thereof over the whole circumference of the cylindrical case 3. A raw-water outlet 12 is provided to a lateral part of the cylindrical case 3 in a position near the upper cap 4.

The upper cap 4 has an inner diameter substantially equal to the inner diameter of the cylindrical case 3, and the upper-end-side portion thereof tapers to form a filtrated-liquid outlet 11. The upper cap 4 has, in a lower-end-side portion thereof, a recessed portion 4A formed over the whole circumference of the upper cap 4, in order to form, when connected to the cylindrical case 3, a groove for fixing a first-end case 7 of the first potting part 24. When the cylindrical case 3 is connected to the upper cap 4, the lower end of the upper cap 4 is in contact with the upper-end flange 3A of the cylindrical case 3 to form the groove (fixing part), and a flange 7A of the first-end case 7 of the first potting part 24, which will be described later, is fixed with that groove (fixing part).

The lower cap 5 has an inner diameter substantially equal to the inner diameter of the cylindrical case 3, and the lower-end-side portion thereof tapers to form a raw-water inflow port 10. The lower cap 5 has, in an upper-end-side portion thereof, a plurality of recessed portions 5A (four recessed portions 5A in the first embodiment) at the same interval, in order to form, when connected to the cylindrical case 3, depressions for inserting the holding part thereinto. When the cylindrical case 3 is connected to the lower cap 5, the upper end of the lower cap 5 is in contact with the lower-end flange 3B of the cylindrical case 3 to thereby form first holding grooves 17 between the upper surface of the lower cap 5 and the lower surface of the flange 3B of the cylindrical case 3. In the first embodiment, pins (holding part) 18 are inserted into the first holding grooves 17.

<Hollow-fiber Membrane Module>

The cartridge type hollow-fiber membrane module 101A of the invention includes a hollow-fiber membrane cartridge 100, which is shown in FIG. 2, mounted in the housing. The hollow-fiber membrane cartridge 100 includes a plurality of hollow fiber membranes 1, and has a first potting part 24 disposed in the housing on the side facing the filtrated-liquid outlet 11 and a second potting part 25 disposed in the housing on the side facing the raw-water inflow port 10.

<First Potting Part>

The first potting part 24, which is an upper-end-side portion of the hollow-fiber membrane cartridge 100 and is disposed in the housing on the side facing the filtrated-liquid outlet 11, is configured by bonding, with an adhesive or the like, a first end of a hollow-fiber membrane bundle 2 including a large number of hollow fiber membranes 1, thereby forming a first bonded part 6, and disposing the first bonded part 6 in a first-end case 7. In this hollow-fiber membrane bundle 2, the hollow fiber membranes 1 are bundled while keeping the upper ends thereof open. The first-end case 7 is cylindrical, and has, at the upper end thereof, a flange 7A formed over the whole circumference of the first-end case 7. By inserting the flange 7A of the first-end case 7 into the groove (fixing part) formed when the cylindrical case 3 is connected to the upper cap 4, the first potting part 24 is liquid- and air-tightly fixed to the upper end of the cylindrical case 3.

Raw water which has been supplied from outside the hollow fiber membranes 1 permeates the hollow fiber membranes 1, and the resultant filtrated liquid passes through the hollow parts of the hollow fiber membranes 1 and is discharged through the openings of the hollow fiber membranes 1.

In the first embodiment, a first-end case 7 is used. However, there is no need of always using the first-end case 7, and a first potting part 24 can be formed with the first bonded part 6 alone.

<Flow Regulation Cylinder>

A cylindrical flow regulation cylinder 14 having a plurality of slits extending in the axial direction is provided to the first-end case 7 on the lower side thereof (i.e., on the side facing the raw-water inflow port 10). Liquids can be passed through the flow regulation cylinder 14 via the slits. The flow regulation cylinder 14 is provided in the housing in a position near the raw-water outlet 12, for the purpose of preventing the treated raw water from channeling. In the case where the cartridge type hollow-fiber membrane module 101A is to be sterilized with steam, it is preferable that a gap 28 for steam drain discharge is formed also between the lower end of the flow regulation cylinder and the cylindrical case 3 in order to prevent steam drain stagnation. From the standpoint of improving steam drain dischargeability, it is preferable that the gap 28 is provided so as to have a dimension, in the radial directions of the module, of 0.5 mm or larger, and the dimension thereof is more preferably 1 mm or larger. In case where the gap 28 is less than 0.5 mm, the steam drain is less apt to be discharged, resulting in the concern of a failure in temperature rising.

Heating to a sufficiently high temperature is possible by elevating the temperature of the steam to be supplied, even when steam drain stagnation occurs. It is, however, preferred to minimize steam drain stagnation. It is preferable that the gap 28 is up to 4% of the inner diameter of the cylindrical case 3, and the dimension thereof is more preferably up to 2%. In case where the gap 28 is larger than 4% of the inner diameter of the cylindrical case 3, the amount of the liquid which passes through the gap 28 during cross flow filtration is larger and the amount of the liquid which passes through a radially central portion and its vicinity of the hollow-fiber membrane module is smaller, resulting in a decrease in the efficiency of membrane cleaning by cross flow.

<Second Potting Part>

The second potting part 25, which is a lower-end-side portion of the hollow-fiber membrane cartridge 100, is disposed in the housing on the side facing the raw-water inflow port 10. The second potting part 25, where the second ends of the hollow fiber membranes 1 are present, is produced by <Processes for producing the Second Potting Part>, which will be given later. The second potting part 25 is configured by bonding, with an adhesive or the like, a hollow-fiber membrane bundle 2 including a large number of hollow fiber membranes 1, thereby forming a second bonded part 8, and disposing the second bonded part 8 in a second-end case 9. The hollow parts of the hollow fiber membranes 1 are sealed with the adhesive and are in the state of being unopen. The second-end case 9 has a cylindrical shape having a bottom as a lower portion thereof, and is configured so as to have an outer diameter smaller than the inner diameter of the housing.

The second potting part 25 has through holes 13 which pierce the second potting part 25 in the axial direction of the housing, the through holes 13 serving as channels for raw water. The raw-water channels in the radial directions of the second potting part 25 are the through holes 13 and the gap 26, and it is preferable that the sum of the channel area of the through holes 13 and the channel area of the gap 26 between the second potting part 25 and the housing is 5 to 30% of the cross-sectional area of the housing (specifically the cylindrical case 3). In the case where the holding part is present in the gap 26, the channel area is the area obtained by subtracting the area of the gap 26 in which the holding part is present from the sum of the cross-sectional area of the through holes 13 and the cross-sectional area of the gap 26.

In case where the total channel area (cross-sectional area) is less than 5% of the cross-sectional area of the cylindrical case 3, the channel area is too small and, hence, an increased pressure loss results when raw water is passed during cross flow filtration. High pressure losses are undesirable because the force which pushes the second potting part 25 upward becomes higher to increase the burden imposed on the holding part, resulting in the concern of damage to the holding part. Furthermore, in case where the channel area is too small, deviation of the raw water flow is prone to occur, resulting in a decrease in the effect of cleaning the hollow-fiber membrane bundle by the raw water flow. Meanwhile, in case where the total cross-sectional area exceeds 30%, the area within the second potting part 25 in which hollow fiber membranes can be filled becomes smaller. In case where the area in which hollow fiber membranes can be filled becomes smaller, the degree of packing of hollow fiber membranes (packing density) becomes higher and steam is less apt to infiltrate into interstices among the hollow fiber membranes, resulting in the concern of a sterilization failure. Such a case is hence undesirable.

The cartridge type hollow-fiber membrane module of the invention has a feature in which the second potting part 25 is held by the holding part and the hollow fiber membranes can be inhibited from being lifted up during cross flow filtration or air scrubbing.

Figure 4:
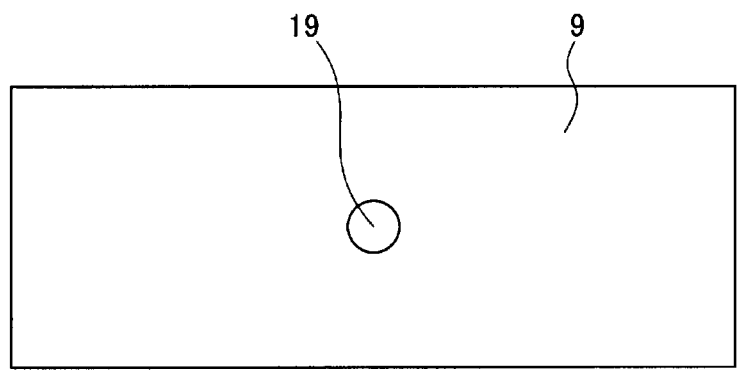
FIG. 4 is a side view of the second potting part of the cartridge type hollow-fiber membrane module of FIG. 1.

In the second-end case 9, recess-shaped second holding grooves 19 are formed in the outer peripheral surface thereof in positions which face the first holding grooves 17 formed in the housing (see FIG. 4). Since the first holding grooves 17 are provided to the housing, pins 18 can be inserted as the holding part into the spaces which are formed when the second holding grooves 19 are positioned so as to face the first holding grooves 17 (see FIG. 5). Namely, pins 18 are inserted into both the first holding grooves 17 and the second holding grooves 19. By such a configuration, the position of the second-end case 9 can be kept in a certain range by the pins 18 and, hence, the hollow fiber membranes can be inhibited from being lifted up during cross flow filtration or air scrubbing.

Figure 3:
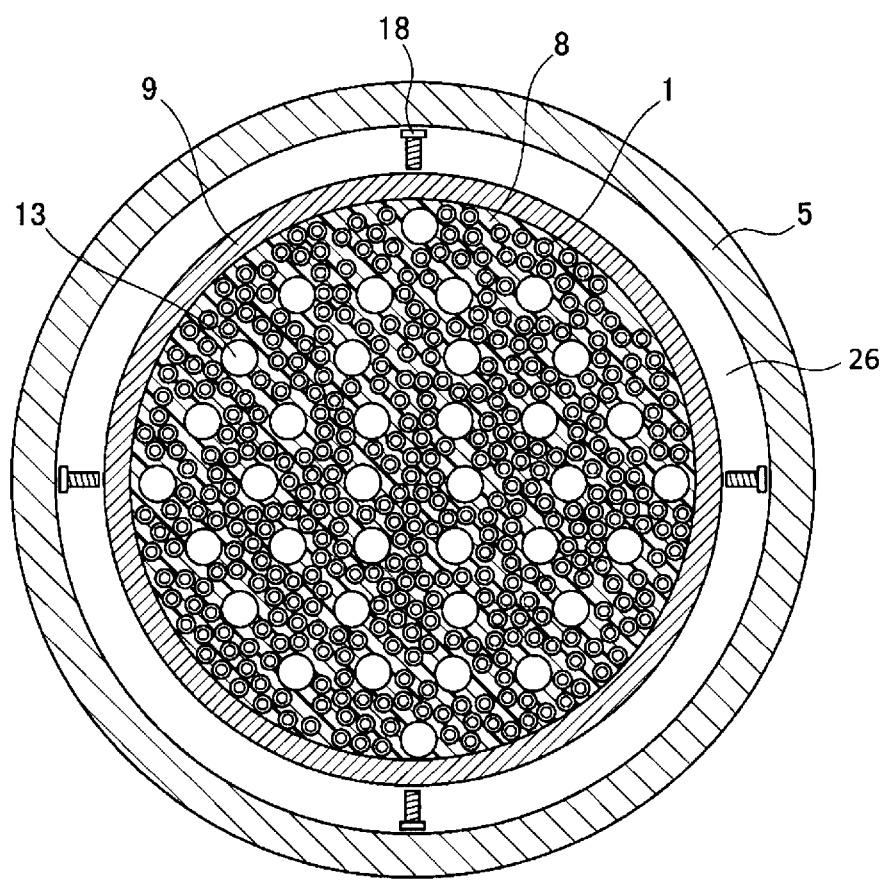
FIG. 3 is a cross-sectional view taken on the line A-A of FIG. 1.

Furthermore, in the case where the second potting part 25 is held by the pins 18, the gap 26 between the second potting part 25 and the housing can be formed so as to ensure liquid-passable channels as shown in FIG. 3, and steam drain can be discharged therethrough during steam sterilization.

In the first embodiment, a second-end case 9 is used. However, there is no need of always using the second-end case 9, and a second potting part 25 can be formed with the second bonded part 8 alone. In this case, second holding grooves 19 are formed in the outer peripheral surface of the second bonded part 8.

<Configuration of the Pins>

Figure 5:
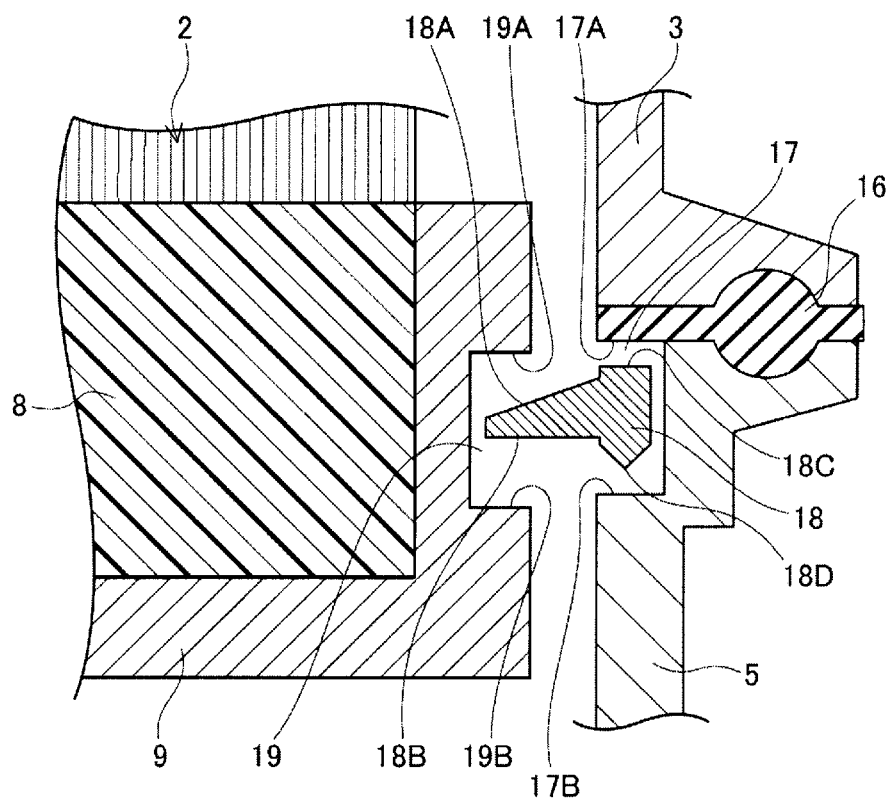
FIG. 5 is an enlarged view of the holding part and its vicinity of the cartridge type hollow-fiber membrane module of FIG. 1.

The pins 18 used in the first embodiment each have, as shown in FIG. 5, a pin inner-side upper surface 18A and a pin inner-side lower surface 18B, which are disposed on the side facing the hollow-fiber membrane cartridge 100, and a pin outer-side upper surface 18C and a pin outer-side lower surface 18D, which are disposed on the housing side.

The pin inner-side upper surface 18A has an inclined surface which descends towards the tip. The pin inner-side lower surface 18B and the pin outer-side upper surface 18C have flat surfaces which are parallel respectively with the bottom surface (bottom) 19B of the second holding groove 19 and the ceiling surface (ceiling) 17A of the first holding groove 17. The pin outer-side lower surface 18D is formed so as to have an acute-angle shape with a tapered tip.

<Attachment of Hollow-fiber Membrane Cartridge 100 to the Housing>

When the hollow-fiber membrane cartridge 100 is mounted in the housing, the hollow-fiber membrane cartridge 100 is first inserted into the cylindrical case 3, and the flange 7A of the first-end case 7 of the first potting part 24 is made to be hold by the upper surface of the flange 3A of the cylindrical case 3. Next, the lower end of the upper cap 4 is brought into contact with the flange 3A of the cylindrical case 3, with a gasket 16 interposed therebetween, and is fixed with clamps or the like.

Subsequently, pins 18 are inserted into the second holding grooves 19 of the second-end case 9 of the second potting part 25 of the hollow-fiber membrane cartridge 100, and the lower cap 5 is connected. For the connection, the same method as for the upper cap 4 is used. Namely, the upper end of the lower cap 5 is brought into contact with the flange 3B of the cylindrical case 3, with a gasket 16 interposed therebetween, and is fixed with clamps or the like.

In the cartridge type hollow-fiber membrane module 101A thus assembled, the second potting part 25 can be held since the pins 18 are inserted into the spaces formed by both the first holding grooves 17 of the housing and the second holding grooves 19 of the second-end case 9 of the second potting part 25 (see FIG. 5). In case where there is only one holding portion, the pin 18 is prone to fall off due to hydraulic pressure during cross flow filtration or air scrubbing. It is therefore preferred to dispose pins 18 in two or more places (four places in the first embodiment).

<Sealing Part>

In the cartridge type hollow-fiber membrane module 101A of the invention, a sealing part is provided between the first potting part 24 and the housing and, hence, the raw-water side and the filtrated-liquid side are liquid- and air-tightly separated from each other. By disposing a sealing material such as an O-ring 15 or a gasket between the first potting part 24 and the cylindrical case 3 as shown in FIG. 1, the raw-water side and the filtrated-liquid side can be liquid- and air-tightly separated from each other. Although the materials of the O-ring and gasket are not particularly limited, it is more preferred to use materials having excellent heat resistance and high resistance to acids, alkalis, chlorine, etc. Examples of such materials include fluororubbers, silicone rubbers, and ethylene/propylene/diene rubbers (EPDM).

In the case of sterilizing the cartridge type hollow-fiber membrane module 101A with steam, steam is supplied through the raw-water outlet 12 and the resultant steam drain is discharged through the raw-water inflow port 10. However, in case where there are upward spaces in an upper part of the module, air stagnation may occur to inhibit the module from being heated to a sufficiently high temperature, resulting in a sterilization failure. It is therefore preferable that an O-ring 15 is disposed between the first potting part 24 and the cylindrical case 3 as shown in the figure, thereby diminishing spaces which extend upward beyond the level of the steam supply part.

<Gap Between the Second Potting Part and the Housing>

FIG. 3 is a cross-sectional view taken on the line A-A of FIG. 1.

In the case where the cartridge type hollow-fiber membrane module 101A is to be subjected to steam sterilization, it is preferred to provide a gap 26 between the second potting part 25 and the housing (i.e., the cylindrical case 3 and the lower cap 5) as shown in FIG. 1 and FIG. 3. By providing the gap 26, the space between the second potting part 25 and the housing can be rendered liquid-passable and the steam drain which has generated during steam sterilization can be discharged through the gap 26. The gap 26 can be made to have a desired dimension by regulating the outer diameter of the second-end case 9 and the inner diameter of the housing. From the standpoint of improving steam drain dischargeability, is it preferred to provide the gap 26 so as to have a dimension, in the radial directions of the module, of 0.5 mm or larger, and the dimension thereof is more preferably 1 mm or larger. In case where the gap 26 is less than 0.5 mm, the steam drain is less apt to be discharged and there is the concern of a failure in temperature rising. Heating to a sufficiently high temperature is possible by elevating the temperature of the steam to be supplied, even when steam drain stagnation occurs. It is, however, preferred to minimize steam drain stagnation. It is preferable that the gap 26 is up to 4% of the inner diameter of the cylindrical case 3, and the dimension thereof is more preferably up to 2%. In case where the gap 26 is larger than 4% of the inner diameter of the cylindrical case 3, the amount of the liquid which passes through the gap 26 during cross flow filtration is larger and the amount of the liquid which passes through a radially central portion and its vicinity of the hollow-fiber membrane module is smaller, resulting in a decrease in the efficiency of membrane cleaning by cross flow.

Furthermore, by further providing an axially extending gap between the second potting part 25 and the lower cap 5, the steam drain can be discharged therethrough. From the standpoint of ensuring steam drain dischargeability, the dimension of this gap is preferably 0.5 mm or larger, more preferably 1 mm or larger.

In case where the space between the second potting part 25 and the lower cap 5 is liquid-tightly sealed, for example, by disposing a sealing material such as an O-ring between the second potting part 25 and the lower cap 5, steam drain may stagnate on the sealing material to prevent the module from being heated to a sufficiently high temperature, resulting in a sterilization failure. This configuration is hence undesirable.

<Method of Cross Flow Filtration with the Cartridge Type Hollow-fiber Membrane Module>

Raw water flows into the cartridge type hollow-fiber membrane module 101A through the raw-water inflow port 10 of the lower cap 5, and the raw water which has not permeated the hollow fiber membranes 1 is discharged from the cartridge type hollow-fiber membrane module 101A through the raw-water outlet 12. The filtrated liquid which has permeated the hollow fiber membranes 1 from the outside to the inside thereof passes through the hollow parts of the hollow fiber membranes 1 and is discharged from the cartridge type hollow-fiber membrane module 101A through the filtrated-liquid outlet 11 of the upper cap 4.

This mode of filtration in which raw water is filtrated while being caused to flow in parallel with the membrane surfaces is called "cross flow filtration", and has the effect of inhibiting the suspended substances, etc. contained in the raw water from accumulating on the membrane surfaces. Furthermore, in cases when the raw-water outlet 12 is closed, dead-end filtration can be performed in which the raw water is wholly filtrated. It is also possible to supply air through the raw-water inflow port 10 to thereby perform air scrubbing and clean the hollow fiber membranes. The air introduced is discharged through the raw-water outlet 12.

As described above, in cross flow filtration and air scrubbing, fluids flow into the module through the raw-water inflow port 10 disposed in a lower part of the module and are discharged through the raw-water outlet 12 disposed in an upper lateral part of the module. Because of this, force which pushes the second potting part 25 and the hollow fiber membranes 1 upward is exerted due to the ascending flow. In case where the second potting part 25 is not held, there is a concern that the second potting part and the hollow fiber membranes 1 might be pushed up and the hollow fiber membranes might be bent and damaged.

<Method of Steam Sterilization of the Cartridge Type Hollow-fiber Membrane Module>

In the case where the cartridge type hollow-fiber membrane module of the invention is used in applications such as fermentation, steam sterilization is necessary for preventing contamination with various bacteria. Normal conditions of the steam sterilization include 121° C. for 20 minutes, and a decrease in temperature requires a considerably longer period for ensuring sterilizability. It is therefore important to maintain a temperature of 121° C. or higher. In case where air stagnation or steam drain stagnation occurs in the module during steam sterilization, a failure in temperature rising occurs and this may make it impossible to ensure sterilizability. Since air is prone to stagnate in upward dead-end spaces and steam drain is prone to stagnate in downward dead-end spaces, it is preferred to eliminate such stagnation spaces as much as possible.

In steam sterilization, steam is usually supplied from above the pipeline downward in order to facilitate the discharge of the steam drain generated. In the case where a raw-water-side region in the cartridge type hollow-fiber membrane module 101A is sterilized with steam, use may be made of a method in which steam is supplied through the raw-water outlet 12 and the steam drain is discharged through the raw-water inflow port 10. In the case where a filtrated liquid-side region in the cartridge type hollow-fiber membrane module 101A is sterilized with steam, use may be made of a method in which steam is supplied through the filtrated-liquid outlet 11 and the steam drain is discharged through the raw-water inflow port 10. In this operation, the through holes 13 formed in the second potting part 25 serve also as steam drain discharge ports.

<Processes for Producing the Second Potting Part>

To bundle hollow fiber membranes 1 with an adhesive is called "potting". Representative methods for the potting include: a centrifugal potting method in which a liquid adhesive is infiltrated into interstices among hollow fiber membranes by utilizing centrifugal force and then cured; and a static potting method in which a liquid adhesive is supplied with a constant-delivery pump or head and allowed to flow naturally and thereby infiltrate into interstices among hollow fiber membranes, and is then cured.

Figure 19:
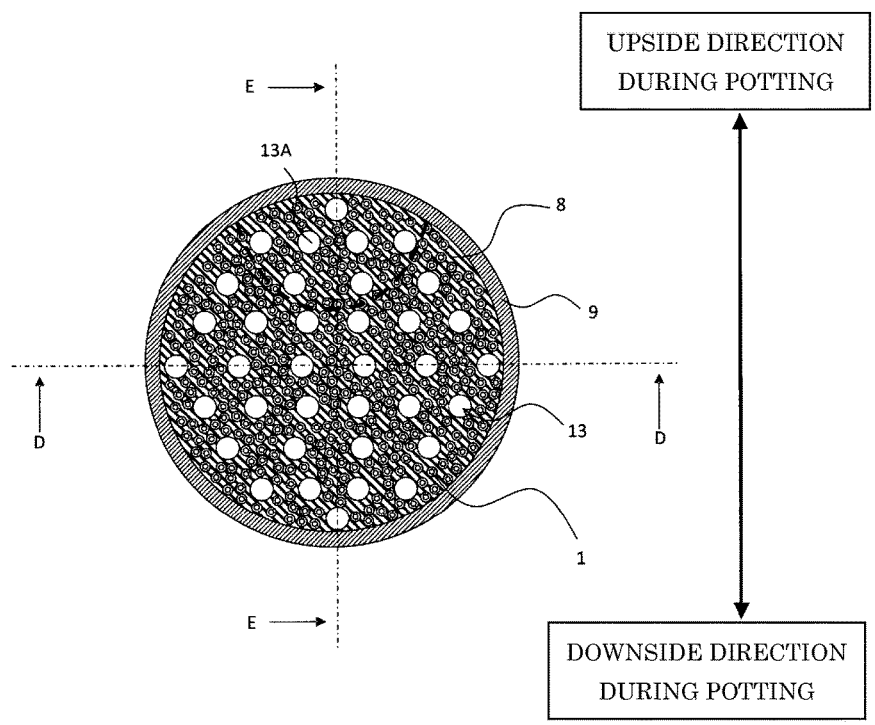
FIG. 19 is a top view of the second potting part of a cartridge type hollow-fiber membrane module.
Figure 20:
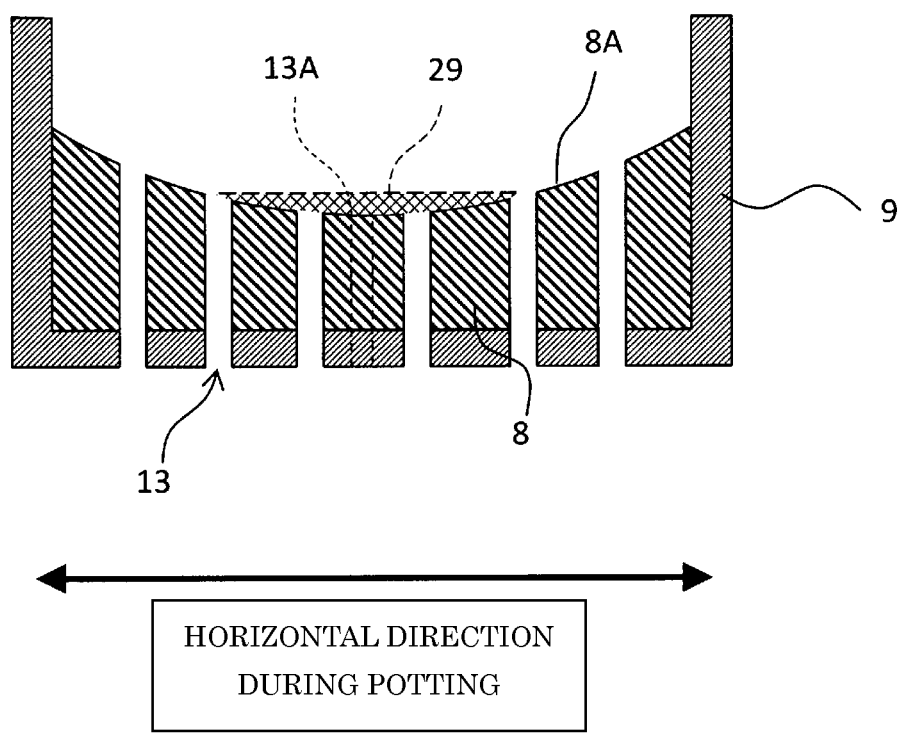
FIG. 20 is a cross-sectional view taken on the line D-D of FIG. 19.
Figure 21:
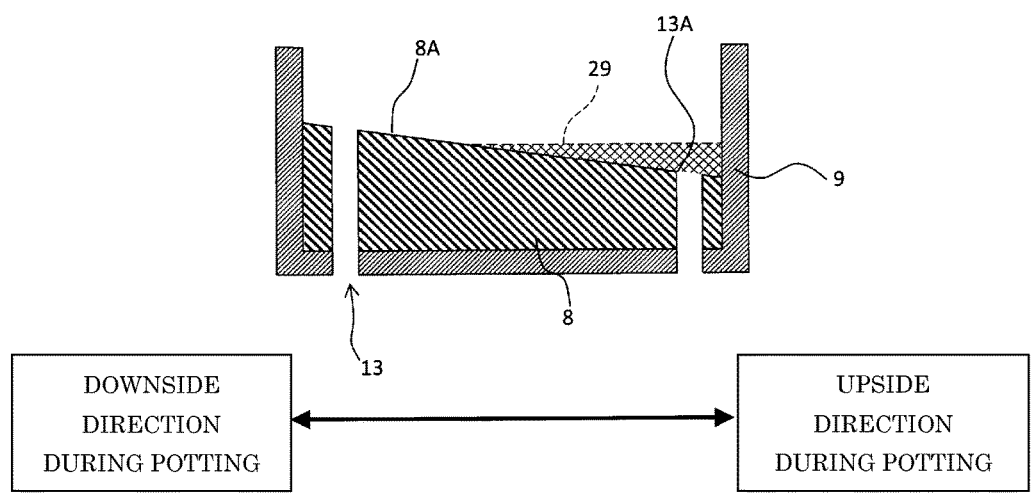
FIG. 21 is a cross-sectional view taken on the line E-E of FIG. 19.

The centrifugal potting method has advantages in that the adhesive is apt to infiltrate into interstices among the hollow fiber membranes because of the centrifugal force and that adhesives having a high viscosity are also usable. In the centrifugal potting method, a depression is formed in the center of the module by the influence of the centrifugal force, as shown in FIG. 20. In addition, due to the influence of gravity, an inclination is formed between the upside direction and downside direction during the potting, as shown in FIG. 21. Consequently, in the upper surface 8A of the second bonded part (the surface of the second potting part which faces the first potting part), the portion corresponding to the upside direction during the potting constitutes a lower area of the inclination (the region surrounded by broken line in FIG. 19). There is hence a concern that the steam drain 29 which has generated in the module might stagnate in the area corresponding to the upside direction during the potting and thereby cause a failure in temperature rising.

Meanwhile, in the static potting method, the second bonded part can be made to have a horizontal upper surface 8A by vertically standing the second-end case 9. Alternatively, potting can be conducted while the second-end case 9 is kept inclined from the vertical direction, thereby making the upper surface 8A of the second bonded part have an inclination. So long as the upper surface 8A of the second bonded part is horizontal, the steam drain 29 can be discharged even when the openings 13A of the through holes 13 are not present in specific positions. In cases where the upper surface 8A of the second bonded part has an inclination, there is a concern that the steam drain 29 might stagnate in a lower area of the inclination, resulting in a failure in temperature rising.

Heating to a sufficiently high temperature is possible by elevating the temperature of the steam to be supplied, even when the steam drain 29 stagnates. It is, however, preferred to minimize the stagnation of the steam drain 29. It is therefore preferable that the openings 13A of through holes 13 for discharging the steam drain 29 are disposed in the lower area of the inclination in the upper surface 8A of the second bonded part. Here, it is preferable that the opening(s) 13A of the through hole(s) 13 is/are provided in the region on the upper surface 8A of the second bonded part which ranges within a height of 3 mm from the lowest portion of the surface. It is more preferable that the opening(s) 13A of the through hole(s) 13 is/are provided in the region which ranges within a height of 1 mm therefrom. It is most preferable that the opening(s) 13A of the through hole(s) 13 is/are provided in the lowest portion of the upper surface 8A of the second bonded part.

<Centrifugal Potting Method>

Figure 22:
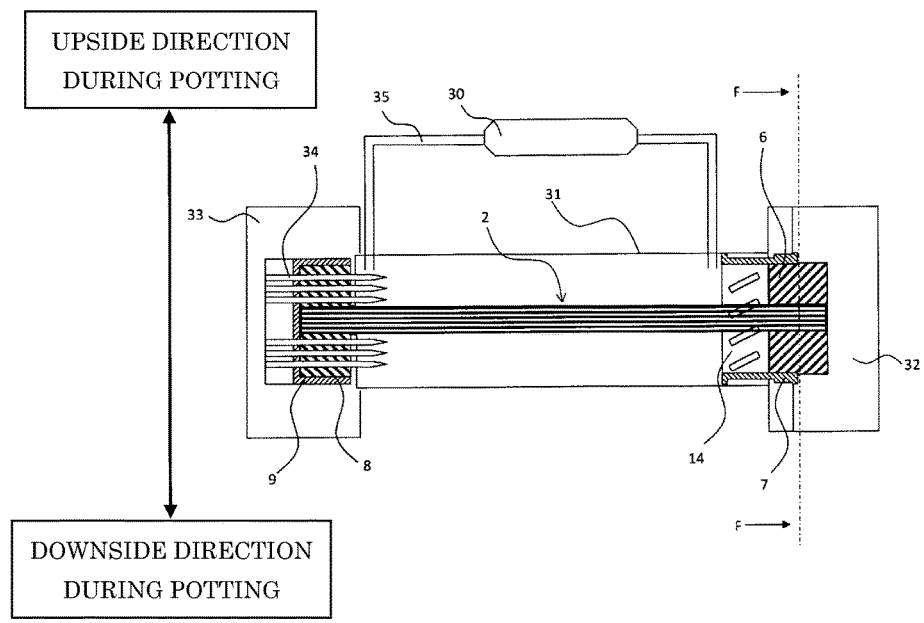
FIG. 22 is a diagrammatic view for illustrating a centrifugal potting method.

An example of the centrifugal potting method is shown in FIG. 22. A hollow-fiber membrane bundle 2 in which the first-end side thereof has been filled beforehand with an adhesive is inserted into a cylindrical case 31 for potting (separable into upper and lower portions). A first-end case 7 and a potting cap 32 for the first end are attached to the first-end side, and a second-end case 9 and a potting cap 33 for the second end are attached to the second-end side. The filling is an operation in which the hollow parts at the end part of the hollow fiber membranes are filled with an adhesive, followed by curing. This filling is conducted in order to thereby prevent, during the centrifugal potting, the adhesive from infiltrating into further inner parts of the hollow parts of the hollow fiber membranes. This is because in case where the adhesive infiltrates into inner parts of the hollow parts and cures, the hollow fiber membranes are not opened even when the bonded part is cut after the potting, making it impossible to pass liquids therethrough. The bottom surface of the second-end case 9 has holes, and pins 34 for through-hole formation are inserted thereinto.

This assembly is set in a centrifugal molding device, and an adhesive feeder 30 and tubes 35 are connected to the cylindrical case 31 for potting. Thereafter, the centrifugal molding device is rotated, and an adhesive is introduced into the adhesive feeder. As a result, the adhesive is injected into the first-end case and the second-end case by centrifugal force. After the adhesive has cured, the centrifugation is stopped, and the potting caps 32 and 33 on both ends, which are for the first end and for the second end, respectively, and the cylindrical case for potting are removed. Then, the pins 34 for through-hole formation are removed, upon which through holes 13 are formed. Thereafter, with respect to the first-end side, the cured adhesive is cut along the line F-F of FIG. 22 to open the hollow fiber membranes 1. Meanwhile, with respect to the second-end side, an adhesive has infiltrated into the hollow parts of the hollow fiber membranes 1, and the hollow parts are sealed and in the state of being not liquid-passable.

<Holding of the Lifted Second Potting Part by Areal Contact>

Figure 6:
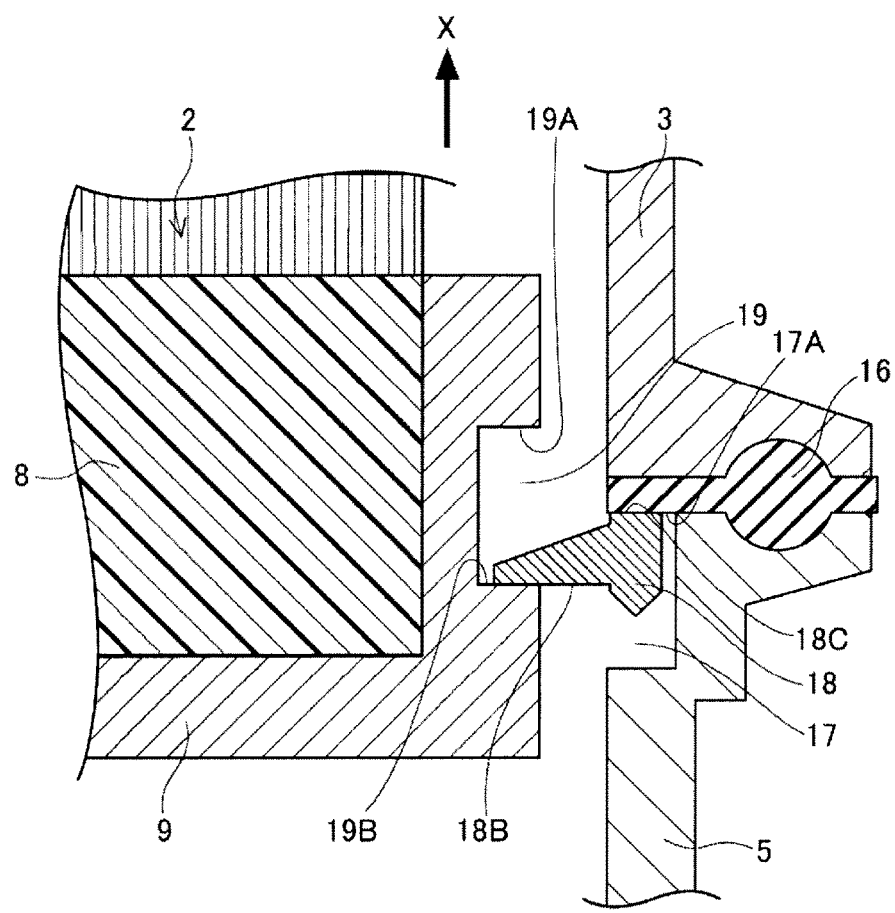
FIG. 6 is an enlarged view of the holding part and its vicinity of the cartridge type hollow-fiber membrane module of FIG. 1.

FIG. 6 is an enlarged view of the second-end case 9 and its vicinity of the cartridge type hollow-fiber membrane module 101A. FIG. 6 shows the structure of the module in which the second potting part 25 has been lifted up (has moved upward) during cross flow filtration or air scrubbing.

When raw water or air flows in through the raw-water inflow port 10 of the housing during cross flow filtration or air scrubbing, the second potting part 25 is lifted up upward (in the direction X) as shown in FIG. 6. At this point of time, the pin inner-side lower surface 18B of each pin 18 and the bottom surface (bottom) 19B of the corresponding second holding groove 19 of the second-end case 9 come into areal contact with each other, and the pin outer-side upper surface 18C of the pin 18 and the ceiling surface (ceiling) 17A of the corresponding first holding groove 17 of the housing come into areal contact with each other. As a result, the upward movement of the second potting part 25 is restricted.

As compared with line contacts, such areal contacts are low in the burden imposed on the members. It is therefore preferable that when the second potting part 25 has been lifted up during cross flow filtration or air scrubbing, the second potting part 25 is held by bringing the pin inner-side lower surfaces 18B into areal contact with the bottom surfaces 19B of the second holding grooves 19 and bringing the pin outer-side upper surfaces 18C into areal contact with the ceiling surfaces 17A of the first holding grooves 17. The term "areal contact" herein means contact between two objects in which the contact portions are flat surfaces. The larger the contact area, the lower the burden per unit area imposed on the holding part. The contact area may be set so that sufficient strength is ensured, while taking account of the force applied to the second potting part.

Meanwhile, the term "line contact" means contact between two objects in which the contact portions coincide with one line. Here, such contact in which the line formed by the contact portions of the two objects has a thickness of 1 mm or less is called line contact.

Due to this configuration, the pins 18 which have come into contact with the ceiling surfaces 17A of the first holding grooves 17 are, on the other hand, locked with the bottom surfaces 19B of the second holding grooves 19. As a result, the movement of the second potting part 25 stops, and the membranes can be inhibited from being lifted up.

<Improvement of Steam Sterilizability by Line Contact>

Figure 7:
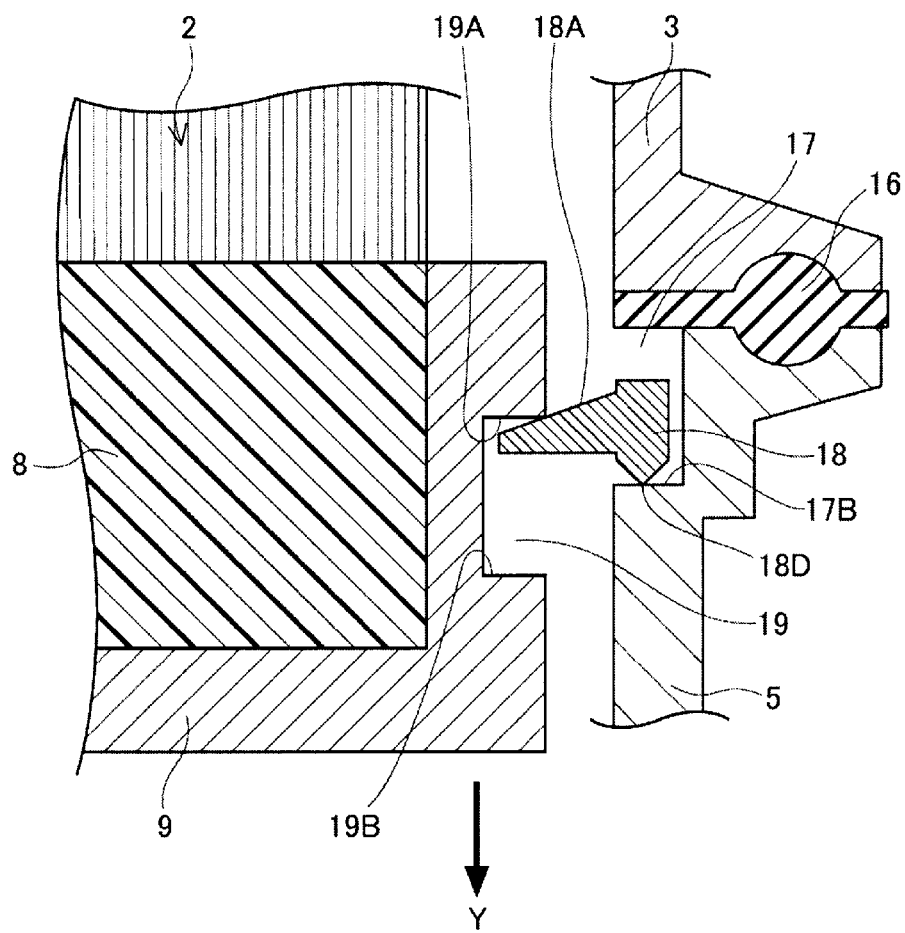
FIG. 7 is an enlarged view of the holding part and its vicinity of the cartridge type hollow-fiber membrane module of FIG. 1.

FIG. 7 is an enlarged view of the second-end case 9 and its vicinity of the cartridge type hollow-fiber membrane module 101A. FIG. 7 shows the structure of the module in which during steam sterilization, the second potting part 25 has descended (has moved downward) and the second potting part 25 is supported by the pins 18. There are cases where the hollow fiber membranes are stretched and rupture upon the descent of the second potting part 25. It is therefore desirable to support the second potting part 25 to prevent the descent.

During steam sterilization, when steam is supplied through the raw-water outlet 12 of the housing and the steam is discharged through the raw-water inflow port 10, the second potting part 25 moves downward (in the direction Y) as shown in FIG. 7. At this point of time, the pin inner-side upper surface 18A of each pin 18 comes into line contact with the ceiling surface (ceiling) 19A of the corresponding second holding groove 19 of the second-end case 9, and the pin outer-side lower surface 18D of the pin comes into line contact with the bottom surface (bottom) 17B of the corresponding first holding groove 17 of the housing. As a result, the downward movement of the second potting part 25 is restricted.

When the cartridge type hollow-fiber membrane module 101A is sterilized with steam, it is preferred to diminish contact surfaces and to provide gaps for steam penetration in order to improve sterilizability. In cases when the module 101A has the structure in which the pin inner-side upper surfaces 18A can come into line contact with the ceiling surfaces 19A of the second holding grooves 19 and the pin outer-side lower surfaces 18D can come into line contact with the bottoms 17B of the first holding grooves 17, as shown in FIG. 7, it is possible to diminish contact surfaces and ensure gaps for steam penetration. Examples of methods for configuring such a structure in which line contact is possible include a method in which the holding part or holding grooves are made to have an inclination and a method in which the contact portions are made to have an acute-angle structure or a rounded structure.

Due to this configuration, the pins 18 which have come into contact with the ceiling surfaces 19A of the second holding grooves 19 are, on the other hand, locked with the bottom surfaces 17B of the first holding grooves 17. As a result, the movement of the second potting part 25 stops and the membranes can be inhibited from descending.

Besides the structure shown in FIG. 7, use can be made of a configuration in which the ceiling surfaces 19A of the second holding grooves 19 are made to have an inclination to thereby cause the ceiling surfaces 19A to come into line contact with the pin inner-side upper surfaces 18A. Alternatively, it is possible to make the bottom surfaces 17B of the first holding grooves 17 have an inclination to thereby cause the bottom surfaces 17B to come into line contact with the pin outer-side lower surfaces 18D.

<Length of the Holding Grooves, and Gaps>

In the invention, it is preferable that the length of each of the first holding grooves 17 and second holding grooves 19 is 1 to 20 mm in terms of length along the radial direction of the module. In case where the length thereof is less than 1 mm, it is difficult to hold the second potting part. Meanwhile, lengths thereof larger than 20 mm are undesirable because steam drain stagnation is apt to occur during steam sterilization of the module.

In the case where the cartridge type hollow-fiber membrane module of the invention is to be subjected to steam sterilization, it is preferable that the holding part portion has a structure which facilitates steam penetration while steam drain stagnation is less apt to occur. For example, it is preferable that in the case where the cartridge type hollow-fiber membrane module 101A is to be subjected to steam sterilization, gaps are provided between the pins 18 and the second-end case 9, between the pins 18 and the lower cap 5, and between the pins 18 and the gasket 16. The provision of gaps along the radial direction and axial direction of the module facilitates steam penetration and makes it possible to improve sterilizability.

<Curvature of the Hollow Fiber Membranes>

In cases where the inside of the module is not filled with a liquid and the hollow fiber membranes have low strength, the hollow fiber membranes 1 may rupture due to the weight of the second bonded part 8 and second-end case 9. It is therefore preferable that the second potting part 25 is supported by the holding part when the module is not operated for filtration.

For supporting the second potting part 25, it is necessary that the pin inner-side upper surfaces 18A of the pins 18 are in contact with the ceiling surfaces 19A of the second holding grooves 19 and that the pin outer-side lower surfaces 18D of the pins 18 are in contact with the bottom surfaces 17B of the first holding grooves 17. Use may be made of a method in which hollow fiber membranes having a relatively large length are used to produce a hollow-fiber membrane cartridge 100 beforehand, and the hollow fiber membranes are pushed in when a lower cap 5 is connected. The lower cap 5 is then fixed, with the hollow fiber membranes being in a curved state. As a result, the second potting part 25 is pushed downward in the module by the elasticity of the hollow fiber membranes 1, and the pin inner-side upper surfaces 18A come into contact with the ceiling surfaces 19A of the second holding grooves 19 and the pin outer-side lower surfaces 18D come into contact with the bottom surfaces 17B of the first holding grooves 17. Thus, the second potting part 25 can be supported. It is preferable here that the length over which the hollow fiber membranes 1 are pushed in is 1 mm or larger but up to 5% of the effective length of the hollow fiber membranes 1. In case where the push-in length is less than 1 mm, this length is insufficient and there is a concern that the second potting part cannot be supported. In case where the push-in length is larger than 5% of the effective length of the hollow fiber membranes, there is a concern that the membranes might be bent and damaged.

(Second Embodiment)

Figure 8:
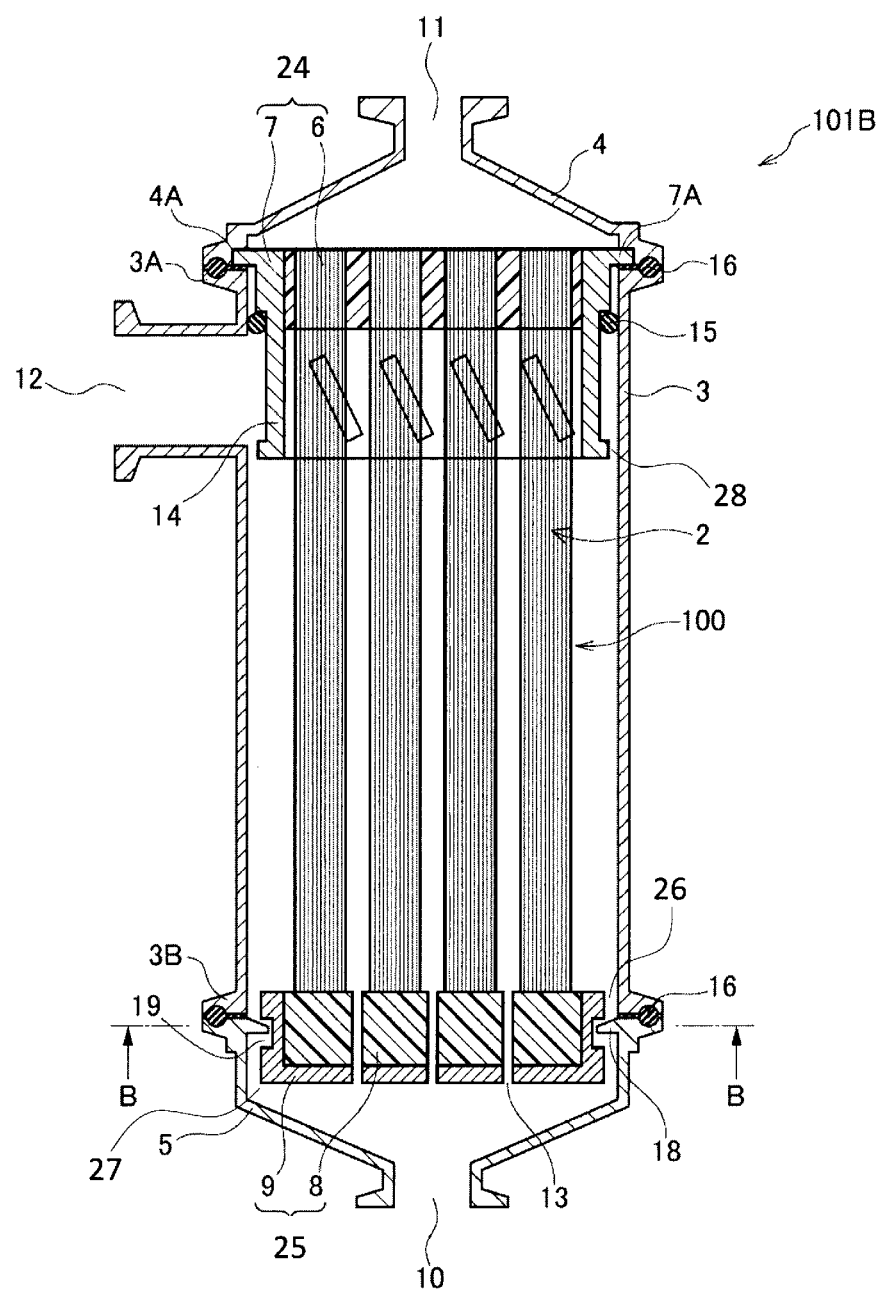
FIG. 8 is a diagrammatic vertical sectional view of a cartridge type hollow-fiber membrane module according to a second embodiment of the invention.

FIG. 8 is a diagrammatic vertical sectional view of a cartridge type hollow-fiber membrane module 101B according to a second embodiment of the invention, and FIG. 9 is a cross-sectional view taken on the line B-B of FIG. 8. In the explanations of the second embodiment, the same members as in the first embodiment are indicated by the same reference numerals or signs, and explanations thereon are omitted.

In the cartridge type hollow-fiber membrane module 101B according to the second embodiment, pins 18 serving as a holding part are provided to a lower cap 5. As shown in FIG. 8 and FIG. 9, the pins 18 are provided so as to protrude from the inner lateral surface of the lower cap 5. Furthermore, second holding grooves 19 are provided to the lateral surface of the second-end case 9 of a second potting part 25, so that the second potting part 25 can be held by inserting the pins 18 into the second holding grooves 19. Methods for forming the pins 18 are not particularly limited. For example, the pins 18 can be formed by machining or can be formed by welding. Alternatively, pins 18 and a lower cap 5 may be subjected to screw thread cutting and then connected to each other. Here, each pin inner-side upper surface 18A has an inclined surface which descends toward the tip. Each pin inner-side lower surface 18B has a flat surface which is parallel with the ceiling surface (ceiling) 19A and bottom surface (bottom) 19B of the corresponding second holding groove 19.

In the case where the second potting part 25 is held with the pins 18, the gap 26 between the second potting part 25 and the housing can be formed so as to ensure liquid-passable channels as shown in FIG. 9, and steam drain can be discharged therethrough during steam sterilization.

<Configuration of Second Holding Grooves>

Figure 10:
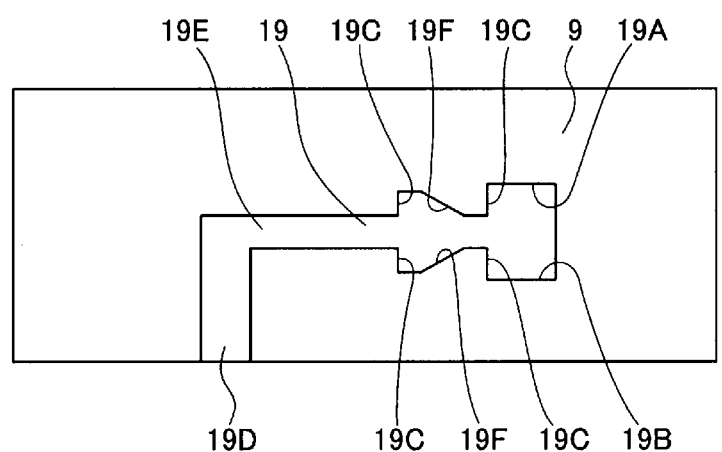
FIG. 10 is a side view of the second potting part of the cartridge type hollow-fiber membrane module of FIG. 8.

FIG. 10 is a side view of the second potting part 25 of the cartridge type hollow-fiber membrane module 101B of FIG. 8, and shows a second holding groove 19 provided in the lateral surface of the second-end case 9.

The second holding groove 19 includes: a vertical groove part 19D, which extends in the axial direction and serves as an inlet for a pin 18; and a horizontal groove part 19E, which extends in the circumferential direction from the end of the vertical groove part 19D. The horizontal groove part 19E has rugged portions 19C for preventing the pin from detaching therefrom.

When the hollow-fiber membrane cartridge 100 is mounted in a housing, the hollow-fiber membrane cartridge 100 is first inserted into a cylindrical case 3 and an upper cap 4 is then connected to fix the first potting part 24, in the same manner as in the first embodiment. Subsequently, before the lower cap 5 is connected, the pins 18 provided to the lower cap 5 are inserted into the vertical groove parts 19D of the second holding grooves 19 and are slid in the circumferential direction. Thereafter, the lower cap 5 is connected to the cylindrical case 3. By thus attaching the lower cap 5, the pins 18 can be held in the second holding grooves 19.

In the second embodiment, in case where the hollow-fiber membrane cartridge 100 rotates when the cartridge type hollow-fiber membrane module 101B is operated for filtration, the rotation may result in detachment of the pins 18 from the second holding grooves 19. It is therefore preferable that the length of the horizontal groove part 19E of each second holding groove 19 is ensured so that the lower cap 5 can be fixed by rotating the lower cap 5 by 30 degrees or larger, more preferably 60 degrees or larger.

Furthermore, the provision of the rugged portions 19C to each horizontal groove part 19E can prevent the pins 18 from detaching due to the rotation of the hollow-fiber membrane cartridge 100. The rugged portions 19C can be formed by widening the groove in the upside direction and downside direction of the cartridge type hollow-fiber membrane module 101B. At least one rugged portion 19C may suffice, or a plurality of rugged portions 19C may be provided in order to prevent each pin 18 from detaching.

Figure 11:
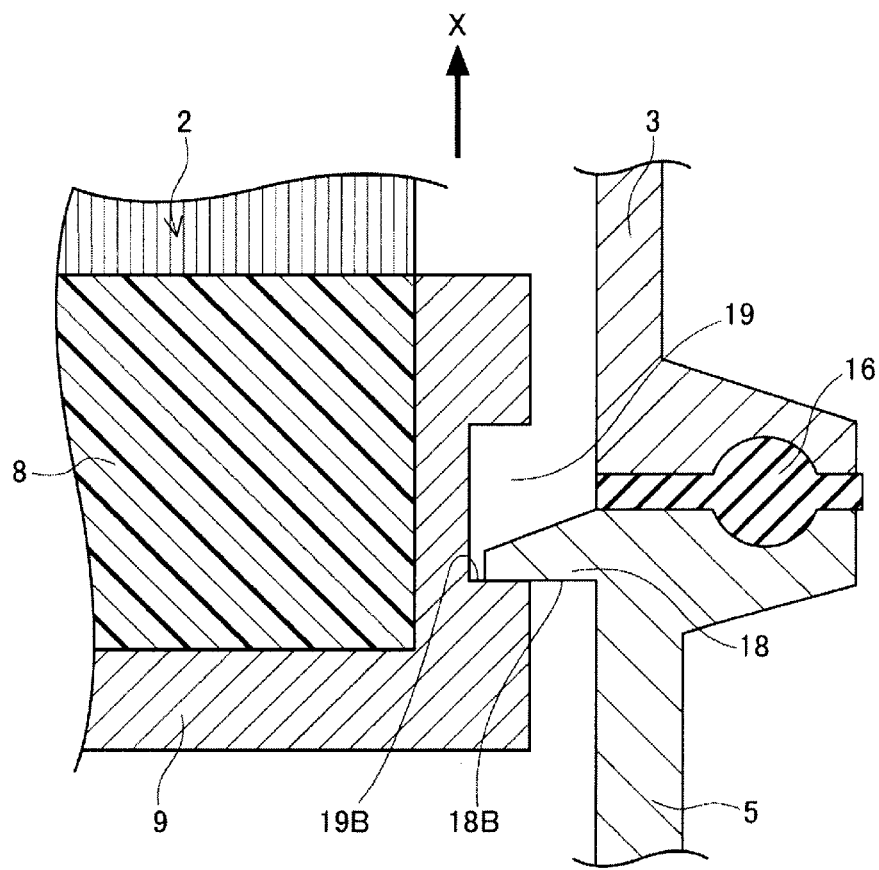
FIG. 11 is an enlarged view of the holding part and its vicinity of the cartridge type hollow-fiber membrane module of FIG. 8.

When the module 101B is not operated for filtration, the lower cap 5 is fixed so that the pin inner-side upper surfaces 18A are in contact with the ceiling surfaces 19A of the second holding grooves 19. As a result, the pins 18 are caught by the rugged portions 19C and, hence, not only the hollow-fiber membrane cartridge 100 can be prevented from rotating but also the pins 18 can be prevented from detaching from the second holding grooves 19. Meanwhile, in cases where the second potting part 25 is lifted up (moved upward) during cross flow filtration or air scrubbing, the pin inner-side lower surfaces 18B come into contact with the bottom surfaces 19B of the second holding grooves 19 as shown in FIG. 11 and, hence, the pins 18 are caught by the rugged portions 19C, making it possible to prevent the hollow-fiber membrane cartridge 100 from rotating. Although a plurality of rugged portions 19C may be provided as shown in FIG. 10, it is preferable that the rugged portion(s) 19C other than that located at the end of the second holding groove 19 is/are configured so that the opposed surfaces 19F, which are opposed to each other along the circumferential direction of the second-end case 9, are tapered to gradually reduce the groove width toward the direction in which the pin 18 is moved, for the purpose of enabling the pin 18 to slide easily when the lower cap 5 is attached.

<Holding by Areal Contact>

FIG. 11 is an enlarged view of the second-end case 9 and its vicinity of the cartridge type hollow-fiber membrane module 101B. FIG. 11 shows the structure of the module in which the second potting part 25 has been lifted up (has moved upward) during cross flow filtration or air scrubbing.

When raw water or air flows in through the raw-water inflow port 10 of the housing during cross flow filtration or air scrubbing, the second potting part 25 is lifted up upward (in the direction X) as shown in FIG. 11.

At this point of time, the pin inner-side lower surface 18B of each pin 18 and the bottom surface (bottom) 19B of the corresponding second holding groove 19 of the second-end case 9 come into areal contact with each other. As a result, the upward movement of the second potting part 25 is restricted.

As compared with line contacts, such areal contacts are low in the burden imposed on the members of the pins 18 and second holding grooves 19. It is therefore preferable that the module 101B has such a structure that when the second potting part 25 has been lifted up during cross flow filtration or air scrubbing, the pin inner-side lower surfaces 18B are capable of coming into areal contact with the bottom surfaces 19B of the second holding proves 19 to thereby hold the second potting part 25.

Due to this configuration, the pins 18 provided to the lower cap 5 are locked with the bottom surfaces 19B of the second holding grooves 19. As a result, the movement of the second potting part 25 stops, and the membranes can be inhibited from being lifted up.

<Improvement of Steam Sterilizability by Line Contact>

Figure 12:
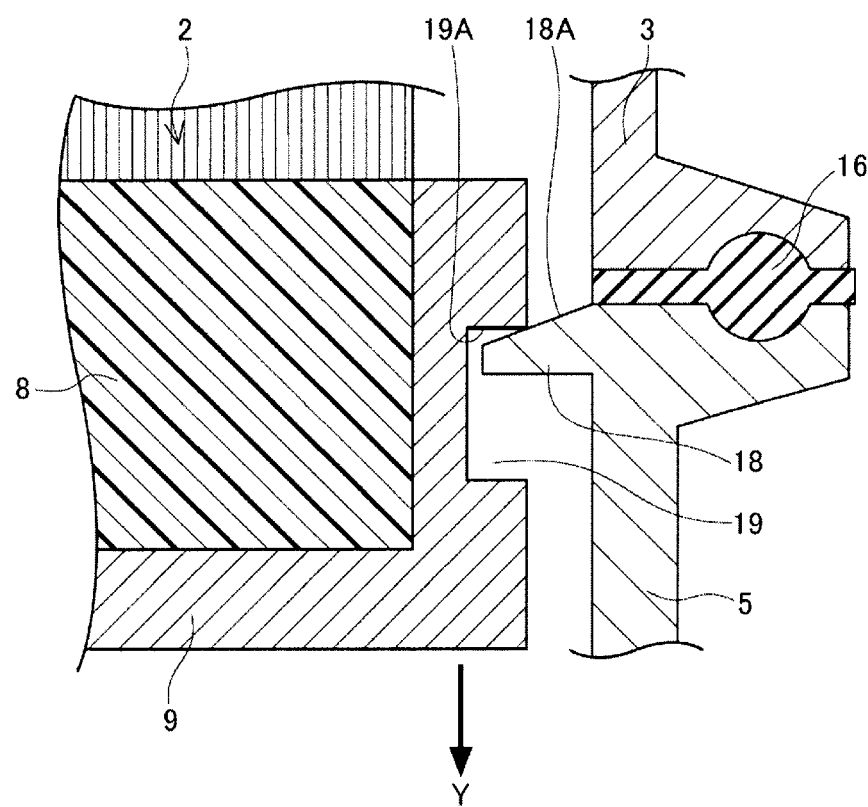
FIG. 12 an enlarged view of the holding part and its vicinity of the cartridge type hollow-fiber membrane module of FIG. 8.

FIG. 12 is an enlarged view of the second-end case 9 and its vicinity of the cartridge type hollow-fiber membrane module 101B. FIG. 12 shows the structure of the module in which during steam sterilization, the second potting part 25 has descended (has moved downward) and the second potting part 25 is supported by the pins 18. There are cases where the hollow fiber membranes are stretched and rupture upon the descent of the second potting part 25. It is therefore desirable to support the second potting part 25 to prevent the descent.

During steam sterilization, when steam is supplied through the raw-water outlet 12 of the housing and the steam is discharged through the raw-water inflow port 10, the second potting part 25 moves downward (in the direction Y) as shown in FIG. 12. At this point of time, the pin inner-side upper surface 18A of each pin 18 comes into line contact with the ceiling surface (ceiling) 19A of the corresponding second holding groove 19 of the second-end case 9. As a result, the downward movement of the second potting part 25 is restricted.

Due to this configuration, the pins 18 provided to the lower cap 5 are locked with the ceiling surfaces 19A of the second holding grooves 19. As a result, the movement of the second potting part 25 stops, and the membranes can be inhibited from descending.

In the second embodiment explained above, pins 18 are provided to the inner surface of the housing. However, pins 18 may be provided to the outer peripheral surface of the second-end case 9 of the second potting part 25, and holding grooves may be formed in the housing.

(Third Embodiment)

<Holding by Ring-shaped Member>

Figure 13:
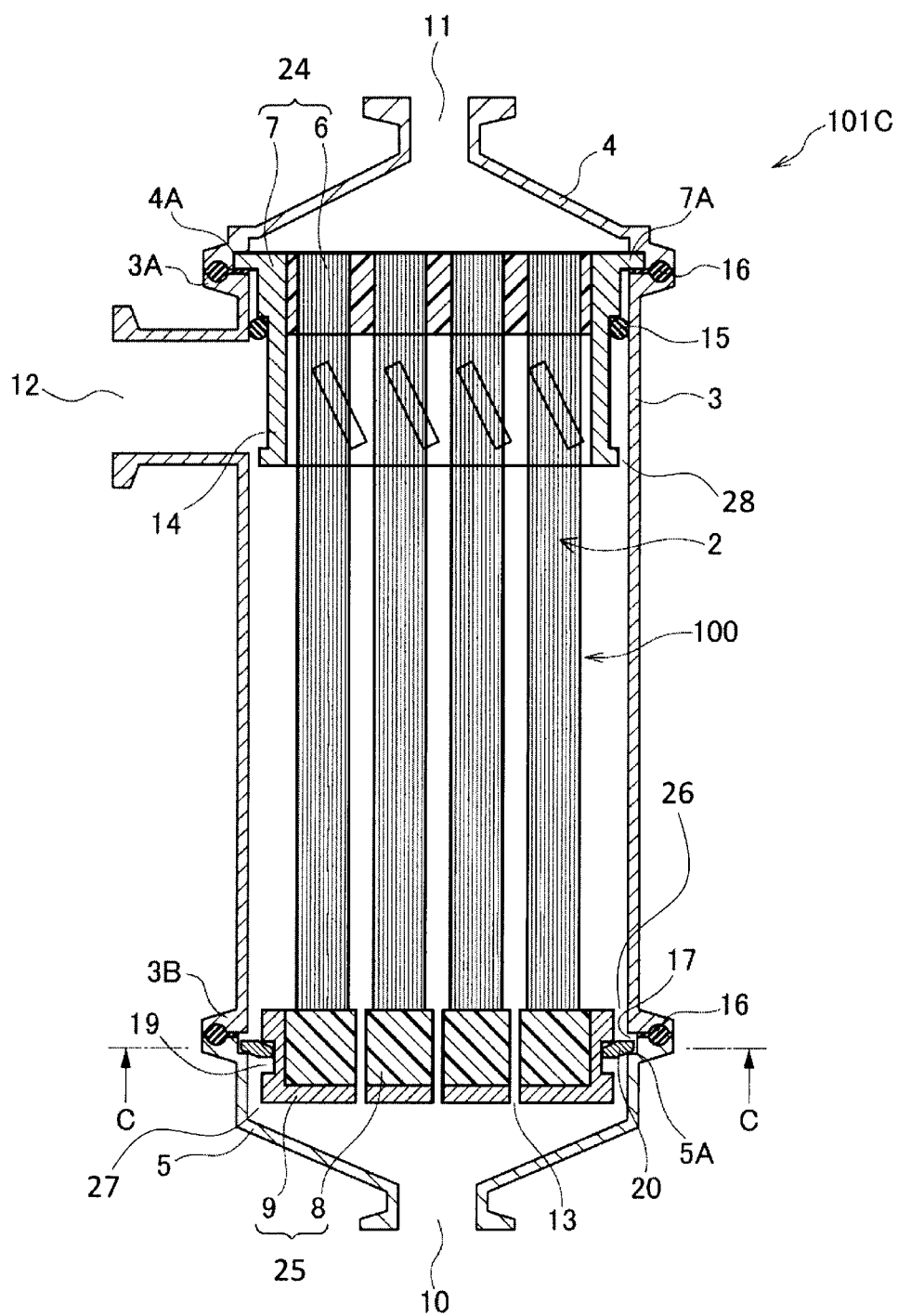
FIG. 13 is a diagrammatic vertical sectional view of a cartridge type hollow-fiber membrane module according to a third embodiment of the invention.
Figure 14:
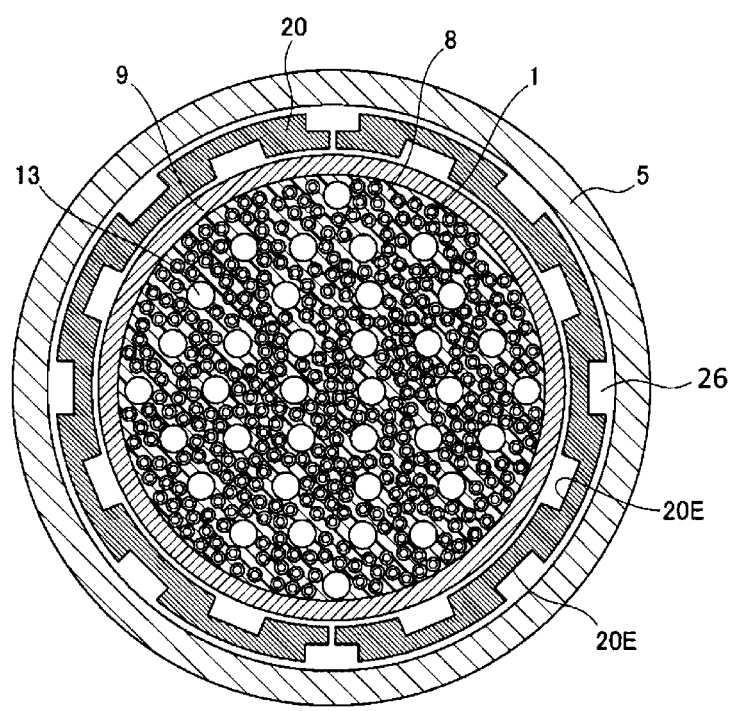
FIG. 14 is a cross-sectional view taken on the line C-C of FIG. 13.

FIG. 13 is a diagrammatic vertical sectional view of a cartridge type hollow-fiber membrane module 101C according to a third embodiment, and FIG. 14 is a cross-sectional view taken on the line C-C of FIG. 13. In the explanations of the third embodiment, the same members as in the first embodiment are indicated by the same reference numerals or signs, and explanations thereon are omitted.

Figure 15:
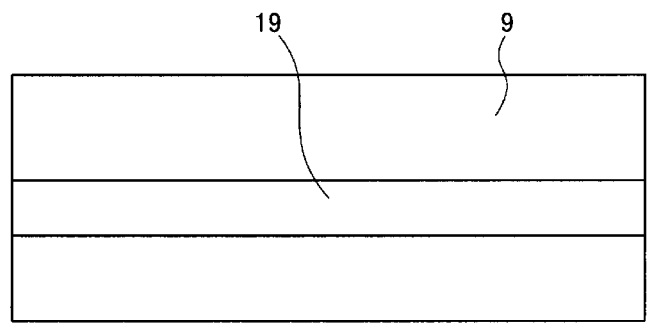
FIG. 15 is a side view of the second potting part of the cartridge type hollow-fiber membrane module of FIG. 13.

In the cartridge type hollow-fiber membrane module 101C according to the third embodiment, a first holding groove 17 is provided in a position which faces the outer peripheral surface of the second-end case 9 of a second potting part 25, and a second holding groove 19 is provided to the outer peripheral surface of the second-end case 9 in a position which faces the first holding groove 17, as in the first embodiment. In the third embodiment, the first holding groove 17 is formed continuously in the inner peripheral surface of the housing, and the second holding groove 19 is similarly formed continuously in the outer peripheral surface of the second-end case 9 as shown in FIG. 15. By inserting a ring 20 between the first holding groove 17 and the second holding groove 19, the second potting part 25 can be held.

<Configuration of the Ring-shaped Member>

It is preferable that the ring 20 as a ring-shaped member is an annular member configured so as to be separable into portions, as shown in FIG. 14. The ring 20 has a plurality of notches 20E for discharging steam drain during steam sterilization. As shown in FIG. 14, the gap 26 between the second potting part 25 and the housing can be configured so as to ensure liquid-passable channels, and the steam drain can be discharged therethrough during steam sterilization. From the standpoint of improving steam drain dischargeability, it is preferable that each notch 20E is formed so that the gap between the end of the ring 20 and the lower cap 5 or the gap between the end of the ring 20 and the second-end case 9 has a dimension of 0.5 mm or larger, more preferably 1 mm or larger.

Figure 16:
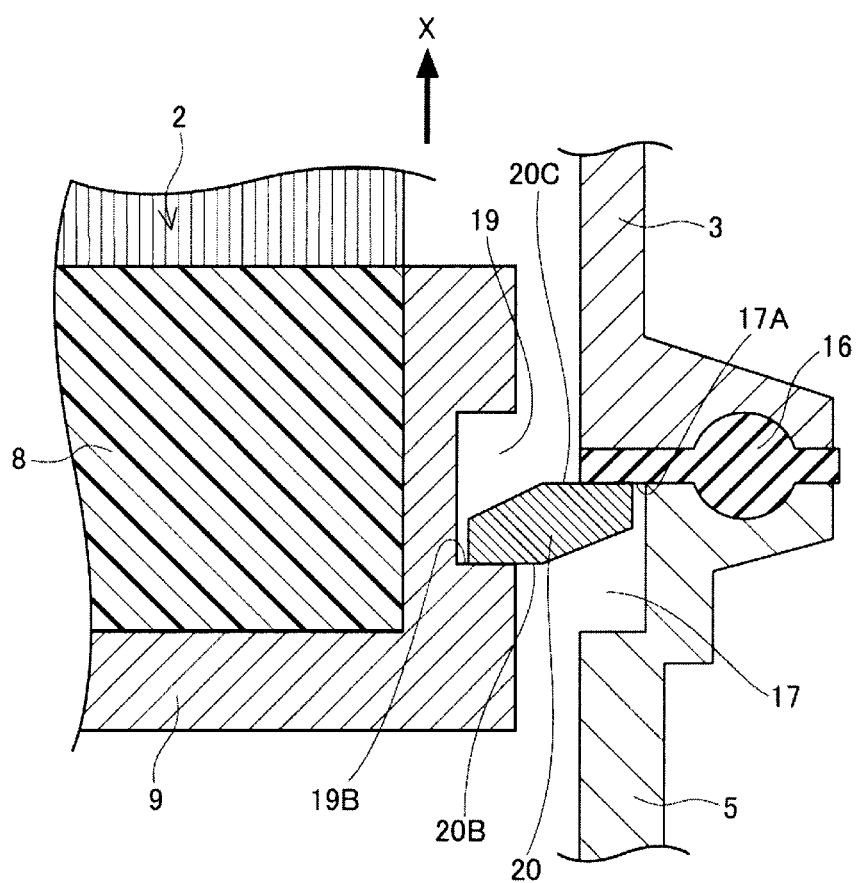
FIG. 16 is an enlarged view of the holding part and its vicinity of the cartridge type hollow-fiber membrane module of FIG. 13.
Figure 17:
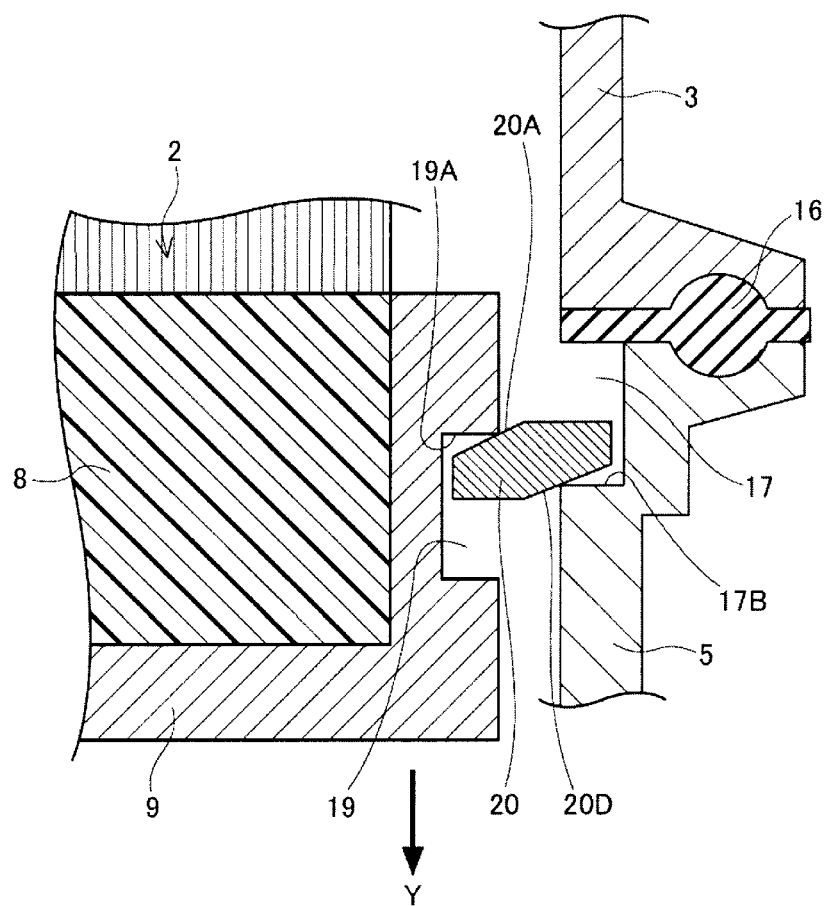
FIG. 17 is an enlarged view of the holding part and its vicinity of the cartridge type hollow-fiber membrane module of FIG. 13.

The ring 20 has such a cross-sectional shape that, as shown in FIG. 16 and FIG. 17, the ring 20 has a ring inner-side upper surface 20A and a ring inner-side lower surface 20B, which are disposed on the side facing the hollow-fiber membrane cartridge 100, and a ring outer-side upper surface 20C and a ring outer-side lower surface 20D, which are disposed on the housing side. The ring inner-side upper surface 20A and the ring outer-side lower surface 20D each have an inclined surface descending toward the tip, and the ring inner-side lower surface 20B and the ring outer-side upper surface 20C have flat surfaces which are parallel respectively with the bottom surface (bottom) 19B of the second holding groove 19 and the ceiling surface (ceiling) 17A of the first holding groove 17.

When the hollow-fiber membrane cartridge 100 is mounted in a housing, the hollow-fiber membrane cartridge 100 is first inserted into a cylindrical case 3 and an upper cap 4 is then connected to fix the first potting part 24, in the same manner as in the first embodiment. Subsequently, the ring 20 which has been separated into portions is inserted into the second holding groove 19 of a second-end case 9, and a lower cap 5 is connected thereto. By thus attaching the members, the ring 20 is inserted between the first holding groove 17 and the second holding groove 19, and the second potting part 25 can be held.

<Holding be Areal Contact>

In the case where the second potting part 25 which has been lifted up during cross flow filtration or air scrubbing is held, that is, in the case where the second potting part 25 moves upward (in the direction X), the inner-side lower surface 20B of the ring 20 comes into areal contact with the bottom surface (bottom) 19B of the second holding groove 19 of the second-end case 9 and the outer-side upper surface 20C of the ring 20 comes into areal contact with the ceiling surface (ceiling) 17A of the first holding groove 17 of the housing.

Due to this configuration, the ring 20 which has come into contact with the ceiling surface 17A of the first holding groove 17 is, on the other hand, locked with the bottom surface 19B of the second holding groove 19. As a result, the upward movement of the second-end case 9 stops, and the membranes can be inhibited from being lifted up.

<Improvement of Steam Sterilizability by Line Contact>

When the cartridge type hollow-fiber membrane module 101C is sterilized with steam, it is preferred to diminish contact surfaces and to provide gaps for steam penetration. In the third embodiment, since the ring 20 has notches 20E, steam drain can be discharged through these notches when the cartridge type hollow-fiber membrane module 101C is sterilized with steam.

In the case where the second potting part 25 is supported with the ring 20 during steam sterilization, that is, in the case where the second potting part 25 has moved downward (in the direction Y), the inner-side upper surface 20A of the ring 20 comes into line contact with the ceiling surface 19A of the second holding groove 19 and the outer-side lower surface 20D of the ring 20 comes into line contact with the bottom surface 17B of the first holding groove 17. As a result, the downward movement of the second potting part 25 is restricted.

(Fourth Embodiment)
<Holding by Stringy Member>

Figure 18:
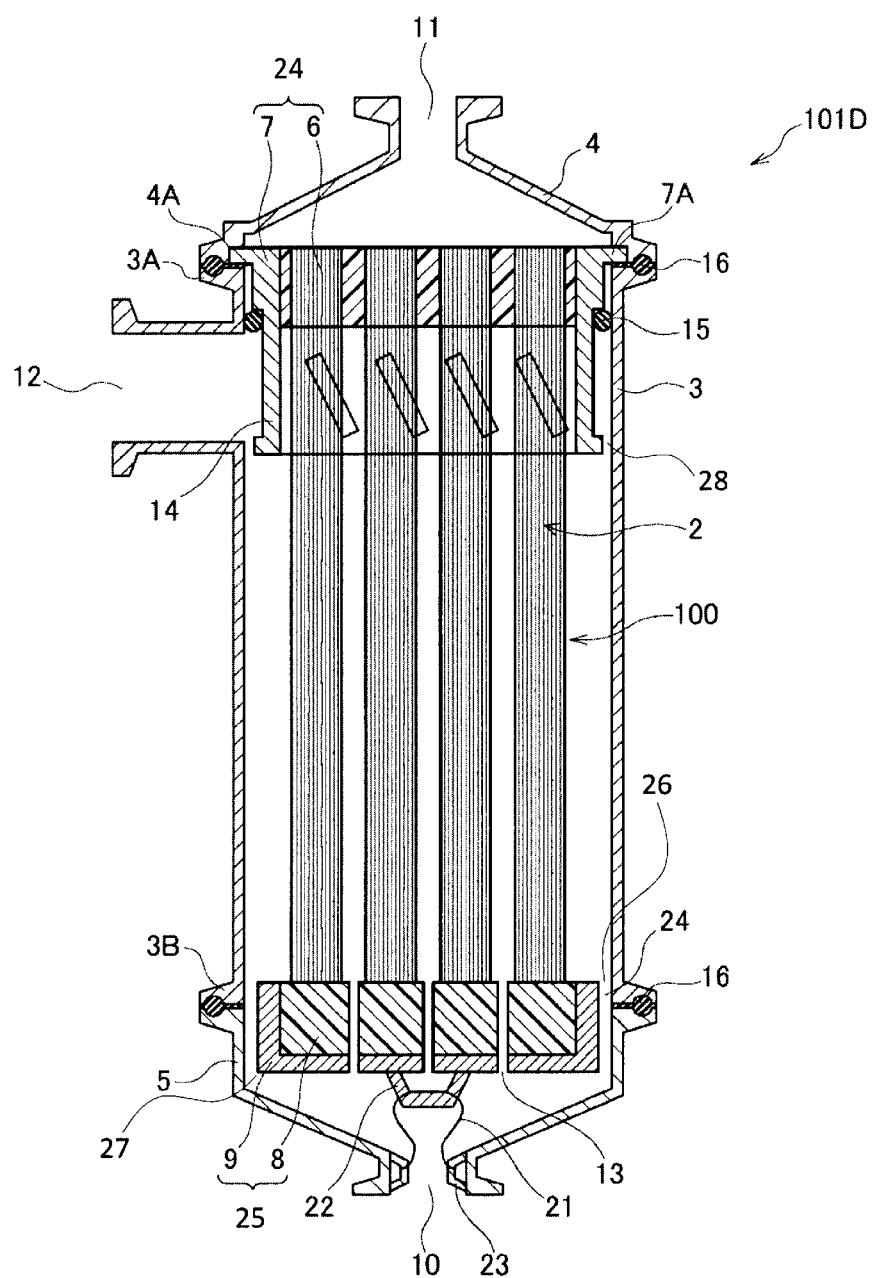
FIG. 18 is a diagrammatic vertical sectional view of a cartridge type hollow-fiber membrane module according to a fourth embodiment of the invention.

FIG. 18 is a diagrammatic vertical sectional view of a cartridge type hollow-fiber membrane module 101D according to a fourth embodiment. In the explanations of the fourth embodiment, the same members as in the first embodiment are indicated by the same reference numerals or signs, and explanations thereon are omitted.

In the cartridge type hollow-fiber membrane module 101D according to the fourth embodiment, a lower-cap hook 23 is provided as a first holder to the lower end of the lower cap 5 of a housing, and a second-end case hook 22 is provided as a second holder to the bottom of the second-end case 9 of a second potting part 25. At least one lower-cap hook 23 and at least one second-end case hook 22 may suffice. The lower-cap hook 23 and the second-end case hook 22 are locked together by means of a stringy member, e.g., a wire 21. Although a wire is used in the fourth embodiment, any stringy holder other than wires may be used so long as the lower cap 5 can be fixed therewith. For example, use can be made of a thread of metal, spring, binding belt, or the like.

When the hollow-fiber membrane cartridge 100 is mounted in a housing, the hollow-fiber membrane cartridge 100 is first inserted into a cylindrical case 3 and an upper cap 4 is then connected to fix the first bonding part 24, in the same manner as in the first embodiment. Subsequently, one end of a wire 21 is connected to the second-end case hook 22, and the other end of the wire 21 is connected to the lower-cap hook 23. Thereafter, the lower cap 5 is connected. By thus configuring the module, the second potting part 25 can be held with the wire 21.

As shown in FIG. 18, a gap 26 extending in the radial direction and a gap 27 extending in the axial direction are provided between the second potting part 25 and the housing. When the cartridge type hollow-fiber membrane module 101D is sterilized with steam, the steam drain can be discharged through the gap 26 and gap 27.

<Hollow Fiber Membranes>

The cartridge type hollow-fiber membrane module of the invention employs hollow fiber membranes as the separation membranes. In general, hollow fiber membranes are advantageous since the membranes have a larger specific surface area than flat sheet membranes and the amount of liquids which can be filtrated therewith per unit time period is large. With respect to the structures of hollow fiber membranes, there are, for example, a symmetric membrane which has an even pore diameter throughout, an asymmetric membrane in which the pore diameter changes in the membrane thickness direction, and a composite membrane which includes a supporting layer for retaining strength and a separation functional layer for separating a target substance.

The average pore diameter of the hollow fiber membranes to be used in the cartridge type hollow-fiber membrane module of the invention may be suitably selected in accordance with the substance to be separated. In the case where the module is to be used for, for example, separating a microorganism, such as a bacterium or fungus, or animal cells, it is preferable that the average pore diameter thereof is 10 to 200 nm. In case where the average pore diameter thereof is less than 10 nm, the membranes have too low water permeability. In case where the average pore diameter thereof exceeds 200 nm, there is a concern that microorganisms and the like might leak out. The term "average pore diameter" in the invention means the pore diameter of the dense layer which has the smallest pore diameter.

The material of the separation membranes to be used in the invention is not particularly limited, so long as the material satisfies heat resistance, chemical durability, etc.

For example, the separation membranes can include a fluororesin such as polytetrafluoroethylene, poly(vinylidene fluoride), poly(vinyl fluoride), a tetrafluoroethylene/hexafluoropropylene copolymer, and an ethylene/tetrafluoroethylene copolymer; a cellulose ester such as cellulose acetate, cellulose acetate propionate, and cellulose acetate butyrate; a polysulfone-based resin such as a polysulfone and a polyethersulfone; or a resin such as polyacrylonitrile, a polyimide, polyethylene, and polypropylene. In particular, separation membranes including a fluororesin or a polysulfone-based resin are high in heat resistance, physical strength, and chemical durability and are hence suitable for use in the cartridge type hollow-fiber membrane module of the invention.

The hollow fiber membranes to be used in the invention may contain a hydrophilic resin in addition to the fluororesin or polysulfone-based resin. With the hydrophilic resin, the separation membranes can be made to have enhanced hydrophilicity and improved water permeability. The hydrophilic resin may be any resin which is capable of imparting hydrophilicity to the separation membranes, and is not limited to specific compounds. For example, cellulose esters, vinyl esters of fatty acids, vinylpyrrolidone, ethylene oxide, propylene oxide, poly(methacrylic ester)-based resins, poly(acrylic ester)-based resins, and the like are suitable for use.

When a hollow-fiber membrane cartridge is produced, hollow fiber membranes are packed into end cases and fixed with an adhesive. In preparation therefor, the hollow fiber membranes are dried beforehand from the standpoint of problems concerning handling and adhesion. However, many kinds of hollow fiber membranes have a problem in that the membranes contract upon drying to decrease in water permeability. Because of this, use is made of hollow fiber membranes which underwent immersion in an aqueous glycerin solution and then drying. In cases when hollow fiber membranes which have been immersed in an aqueous glycerin solution are dried, the membranes can be prevented from contracting upon drying because the glycerin remains in the pores. The membranes can be made to recover the water permeability by thereafter performing an immersion treatment with a solvent such as ethanol.

The cartridge type hollow-fiber membrane module of the invention can be used after sterilized with steam. However, some kinds of hollow fiber membranes contract upon steam sterilization. There is hence a concern that in cases when steam sterilization is performed after module fabrication, the hollow-fiber membranes might rupture due to the contraction thereof. It is therefore desirable that the hollow fiber membranes are subjected beforehand to a steam treatment to cause the membranes to contract. Since steam sterilization is generally conducted at 121° C. or higher, it is desirable to perform the pretreatment beforehand using steam of 121° C. or higher.

<Materials of the Housing, End Cases, Flow Regulation Cylinder, Pins, Ring, etc.>

The material of the housing to be used in the cartridge type hollow-fiber membrane module of the invention is not particularly limited so long as the material satisfies heat resistance, chemical durability, etc. Examples thereof include polysulfone-based resins, fluororesins such as polytetrafluoroethylene and perfluoroalkoxyfluororesins, polycarbonates, polypropylene, polymethylpentene, poly(phenylene sulfide), polyetherketones, stainless steel, and aluminum. Meanwhile, the materials of the first-end and second-end cases, flow regulation cylinder, pins, ring, second-end case hook, and lower-cap hook to be used in the hollow-fiber membrane module of the invention are not particularly limited, and can be selected, for example, from the same materials as those for the housing.

<Adhesive>

The kind of the adhesive to be used for the cartridge type hollow-fiber membrane module of the invention is not particularly limited so long as the adhesive satisfies the strength of adhesion to the member to be bonded, heat resistance, chemical durability, etc. For example, use can be made of an epoxy resin, polyurethane resin, silicone resin, or the like.

EXAMPLES

<Cross Flow Filtration Test>

A cross flow filtration test of the cartridge type hollow-fiber membrane modules obtained in the Examples was conducted by the following method.

Water was supplied from a raw-water tank to the raw-water inflow port of each cartridge type hollow-fiber membrane module using a pump. The supplied water was discharged through both the raw-water outlet and the filtrated-liquid outlet and returned to the raw-water tank. Here, the flow rate of the discharge from the raw-water outlet was regulated to 20 $m^3/h$ (linear velocity on membrane surface, 0.5 m/s) and the flow rate of the discharge from the filtrated-liquid outlet was regulated to 300 L/h, and the module was operated for 100 hours. Thereafter, the hollow-fiber membrane cartridge was taken out, and the hollow fiber membranes were visually examined for bending (buckling).

<Steam Heating Test>

A steam heating test of the cartridge type hollow-fiber membrane modules obtained in the Examples was conducted by the following method.

With respect to the lateral surface of the second potting part of each cartridge type hollow-fiber membrane module, thermocouples were disposed on upper, middle, and lower parts thereof along the axial direction of the housing and fixed with a polyimide tape.

With respect to the upper surface of the second bonded part, a thermocouple was inserted into the membrane bundle and fixed with a polyimide tape so that the contact point thereof was in contact with the upper surface of the second bonded part. Three or more thermocouples were thus disposed in the vicinity of the lowest part of the upper surface of the second bonded part.

After the disposition of thermocouples, 125° C. water vapor was supplied through the raw-water outlet located in an upper part of the hollow-fiber membrane module, and the temperatures were measured at 30 minutes thereafter. A steam trap was disposed under the raw-water inflow port, and the steam drain which generated during the steam heating was discharged.

Example 1

Using 6,000 PVDF hollow fiber membranes (HFS membranes) manufactured by Toray Industries, Inc., the cartridge type hollow-fiber membrane module 101A shown in FIG. 1 was fabricated. The hollow-fiber membrane cartridge 100 was produced by static potting. The second potting part 25 is held with pins 18. The cylindrical case 3 had an inner diameter of 159.0 mm, and the module was fabricated so that the radial-direction gap 26 between the second potting part 25 and the housing was 0.5 mm and the axial-direction gap 27 between the second potting part 25 and the housing was 0.5 mm. The through holes 13 shown in FIG. 3 were formed in the second potting part 25. When the cartridge was produced, the inclination of the second-end case 9 with respect to the vertical direction was regulated during the static potting so that the openings 13A of through holes 13 were disposed in an area ranging to a height of 3.0 mm from the lowest portion of the upper surface 8A of the second bonding part.

This cartridge type hollow-fiber membrane module 101A was subjected to the cross flow filtration test. As a result, no bending of the hollow fiber membranes was observed.

Furthermore, the cartridge type hollow-fiber membrane module 101A was subjected to the steam heating test. As a result, the lowest temperature of the lateral surface of the second potting part was 125° C., and the lowest temperature of the upper surface of the second bonded part was 124° C.

The structure of the hollow-fiber membrane module of Example 1 is shown in Table 1, and the results of the cross flow filtration test and steam heating test are shown in Table 2.

Example 2

Using 6,000 PVDF hollow fiber membranes (HFS membranes) manufactured by Toray Industries, Inc., the cartridge type hollow-fiber membrane module 101B shown in FIG. 8 was fabricated. The hollow-fiber membrane cartridge 100 was produced by static potting. The second potting part 25 is held with pins 18 provided to the inner side of the lower cap 5. The cylindrical case 3 had an inner diameter of 159.0 mm, and the module was fabricated so that the radial-direction gap 26 between the second potting part 25 and the housing was 0.5 mm and the axial-direction gap 27 between the second potting part 25 and the housing was 0.5 mm. The through holes 13 shown in FIG. 9 were formed in the second potting part 25. When the cartridge was produced, the inclination of the second-end case 9 with respect to the vertical direction was regulated during the static potting so that the openings 13A of through holes 13 were disposed in an area ranging to a height of 1.0 mm from the lowest portion of the upper surface 8A of the second bonding part.

This cartridge type hollow-fiber membrane module 101B was subjected to the cross flow filtration test. As a result, no bending of the hollow fiber membranes was observed.

Furthermore, the cartridge type hollow-fiber membrane module 101B was subjected to the steam heating test. As a result, the lowest temperature of the lateral surface of the second potting part was 125° C., and the lowest temperature of the upper surface of the second bonded part was 125° C.

The structure of the hollow-fiber membrane module of Example 2 is shown in Table 1, and the results of the cross flow filtration test and steam heating test are shown in Table 2.

Example 3

Using 6,000 PVDF hollow fiber membranes (HFS membranes) manufactured by Toray Industries, Inc., the cartridge type hollow-fiber membrane module 101C shown in FIG. 13 was fabricated. The hollow-fiber membrane cartridge 100 was produced by static potting. The second potting part 25 is held with a ring 20 having liquid-passable notches. The cylindrical case 3 had an inner diameter of 159.0 mm, and the module was fabricated so that the radial-direction gap 26 between the second potting part 25 and the housing was 3.0 mm and the axial-direction gap 27 between the second potting part 25 and the housing was 3.0 mm. The through holes 13 shown in FIG. 9 were formed in the second potting part 25. When the cartridge was produced, the second-end case 9 was kept standing vertically during the static potting so that the second bonding part came to have a horizontal upper surface 8A.

This cartridge type hollow-fiber membrane module 101C was subjected to the cross flow filtration test. As a result, no bending of the hollow fiber membranes was observed.

Furthermore, the cartridge type hollow-fiber membrane module 101C was subjected to the steam heating test. As a result, the lowest temperature of the lateral surface of the second potting part was 125° C., and the lowest temperature of the upper surface of the second bonded part was 125° C.

The structure of the hollow-fiber membrane module of Example 3 is shown in Table 1, and the results of the cross flow filtration test and steam heating test are shown in Table 2.

Comparative Example 1

A cartridge type hollow-fiber membrane module was fabricated in the same manner as in Example 1, except that the pins 18 were not attached.

This cartridge type hollow-fiber membrane module was subjected to the cross flow filtration test. As a result, the hollow fiber membranes had been pushed up by the flow, and the bending of the hollow fiber membranes was observed.

Furthermore, this cartridge type hollow-fiber membrane module was subjected to the steam heating test. As a result, the lowest temperature of the lateral surface of the second potting part was 125° C., and the lowest temperature of the upper surface of the second bonded part was 124° C.

The structure of the hollow-fiber membrane module of Comparative Example 1 is shown in Table 1, and the results of the cross flow filtration test and steam heating test are shown in Table 2.

Comparative Example 2

A cartridge type hollow-fiber membrane module was fabricated in the same manner as in Example 3, except that in place of the ring 20, a ring-shaped elastic member (silicone rubber) having no notch was used to liquid-tightly seal the space between the second potting part 25 and the housing.

This cartridge type hollow-fiber membrane module was subjected to the cross flow filtration test. As a result, no bending of the hollow fiber membranes was observed.

Furthermore, this cartridge type hollow-fiber membrane module was subjected to the steam heating test. As a result, the steam drain stagnated on the ring-shaped elastic member and, hence, the lowest temperature of the lateral surface of the second potting part was 95° C. The lowest temperature of the upper surface of the second bonded part was 125° C.

The structure of the hollow-fiber membrane module of Comparative Example 2 is shown in Table 1, and the results of the cross flow filtration test and steam heating test are shown in Table 2.

TABLE 1

Module Structure

| | Method of holding second potting part | Radial-direction gap between second potting part and housing | Axial-direction gap between second potting part and housing | Height of through-hole openings from lowest portion of upper surface of second bonded part |
|---|---|---|---|---|
| Ex. 1 | Pins | 0.5 mm | 0.5 mm | 3.0 mm |
| Ex. 2 | pins of lower cap | 0.5 mm | 0.5 mm | 1.0 mm |
| Ex. 3 | ring (with notches) | 3.0 mm | 3.0 mm | 0 mm |
| Comp. Ex. 1 | no holding | 0.5 mm | 0.5 mm | 3.0 mm |
| Comp. Ex. 2 | liquid-tightly sealed with ring-shaped elastic member | 3.0 mm * liquid passage was impossible due to the sealing | 3.0 mm | 0 mm |

TABLE 2

Evaluation Results

| | Membrane bending | Lowest temperature of lateral surface of second potting part during steam heating | Lowest temperature of upper surface of second bonded part during steam heating |
|---|---|---|---|
| Ex. 1 | not occurred | 125° C. | 124° C. |
| Ex. 2 | not occurred | 125° C. | 125° C. |
| Ex. 3 | not occurred | 125° C. | 125° C. |
| Comp. Ex. 1 | occurred | 125° C. | 124° C. |
| Comp. Ex. 2 | not occurred | 95° C. | 125° C. |

The present invention should not be construed as being limited to the embodiments described above, and modifications, improvements, etc. can be suitably made therein at will. Furthermore, the material, shape, dimensions, numerical values, configuration, number, position, etc. of each constituent element in the embodiments described above are not limited so long as the invention can be achieved therewith.

While the invention has been described in detail and with reference to specific embodiments thereof, it will be apparent to one skilled in the art that various changes and modifications can be made therein without departing from the spirit and scope thereof. This application is based on a Japanese patent application filed on Apr. 25, 2013 (Application No. 2013-092701), the contents thereof being incorporated herein by reference.

INDUSTRIAL APPLICABILITY

The cartridge type hollow-fiber membrane module of the invention can be used in the fields of fermentation industry, production of medicines, food industry, water treatment, etc.

DESCRIPTION OF REFERENCE NUMERALS AND SIGNS

100 Hollow-fiber membrane cartridge
101A, 101B, 101C, 101D Cartridge type hollow-fiber membrane module
1 Hollow fiber membrane
2 Hollow-fiber membrane bundle
3 Cylindrical case
3A, 3B Flange
4 Upper cap
4A Recessed portion
5 Lower cap
5A Recessed portion
6 First bonded part
7 First-end case
7A Flange
8 Second bonded part
8A Upper surface of second bonded part
9 Second-end case
10 Raw-water inflow port
11 Filtrated-liquid outlet
12 Raw-water outlet
13 Through hole
13A Opening
14 Flow regulation cylinder
15 O-ring
16 Gasket
17 First holding groove
17A Ceiling surface (ceiling)
17B Bottom surface (bottom)
18 Pin (holding part)
18A Pin inner-side upper surface
18B Pin inner-side lower surface
18C Pin outer-side upper surface
18D Pin outer-side lower surface
19 Second holding groove
19A Ceiling surface (ceiling)
19B Bottom surface (bottom)
19C Rugged portion
19D Vertical groove part
19E Horizontal groove part
19F Opposed surfaces
20 Ring (holding part)
20A Ring inner-side upper surface
20B Ring inner-side lower surface
20C Ring outer-side upper surface
20D Ring outer-side lower surface
20E Notch
21 Wire (holding part)
22 Second-end case hook
23 Lower-cap hook
24 First potting part
25 Second potting part
26 Gap (radial direction of second potting part)
27 Gap (axial direction of second potting part)
28 Gap (radial direction of flow regulation cylinder)
29 Steam drain
30 Adhesive feeder
31 Cylindrical case for potting
32 Potting cap for first end
33 Potting cap for second end
34 Pin for through-hole formation
35 Tube

The invention claimed is:

1. A cartridge type hollow-fiber membrane module comprising:
   a housing;
   a plurality of hollow fiber membranes housed in the housing;
   a first potting part which bundles first ends of the hollow fiber membranes while keeping the first ends open;
   a second potting part which bundles second ends of the hollow fiber membranes while keeping the second ends sealed;
   a fixing part which detachably fixes the first potting part to the housing;
   a sealing part which liquid-tightly seals a space between the first potting part and the housing;
   a first holding groove provided to the housing in a position which faces the second potting part outer peripheral surface;
   a second holding groove provided to the outer peripheral surface of the second potting part in a position which faces the first holding groove;
   a holding part which holds the second potting part so that the second potting part is detachable from the housing and so that liquids can pass through a space between the second potting part and the housing; and
   a flow regulation cylinder provided below the first potting part, wherein
   gaps are provided between the second potting part and the housing and between a lower end of the flow regulation cylinder and the housing, the gaps having a dimension, in a radial direction of the housing, of 0.5 mm or larger,
   the second potting part is movable in the radial direction and an axial direction of the housing,
   the holding part restricts a movement of the second potting part in the axial direction of the housing, and
   the holding part is either a pin that is inserted into both the first holding groove and the second holding groove or an annular member having separable portions each having at least one notch, the annular member being inserted into both the first holding groove and the second holding groove.

2. The cartridge type hollow-fiber membrane module according to claim 1, wherein
   the holding part is a pin that is inserted into both the first holding groove and the second holding groove.

3. The cartridge type hollow-fiber membrane module according to claim 1, wherein
   the holding part is an annular member having separable portions each having at least one notch, the annular member being inserted into both the first holding groove and the second holding groove.

4. The cartridge type hollow-fiber membrane module according to claim 1, wherein
   at least one holding groove is provided to the housing in a position which faces the outer peripheral surface of the second potting part, or provided to the second potting part in a position which faces an inner peripheral surface of the housing,
   if the housing has the holding groove, the holding part is provided to the second potting part in a position which faces the holding groove,
   if the second potting part has the holding groove, the holding part is provided to the housing in a position which faces the holding groove, and
   the holding part is a pin, and the pin is inserted into the holding groove.

5. The cartridge type hollow-fiber membrane module according to claim 2, wherein when the second potting part is moved in a direction opposite from the first potting part, the holding part is in line contact with both the first holding groove and the second holding groove to thereby hold the second potting part.

6. The cartridge type hollow-fiber membrane module according to claim 4, wherein when the second potting part is moved in the direction opposite from the first potting part, the holding part is in line contact with the holding groove to thereby hold the second potting part.

7. The cartridge type hollow-fiber membrane module according to claim 1, wherein
   the housing is equipped with at least one first fastener,
   the second potting part is equipped with at least one second fastener, and
   the holding part is a stringy member, and the stringy member connects the first fastener and the second fastener to each other.

8. The cartridge type hollow-fiber membrane module according to claim 1, wherein
   the second potting part has one or more through holes which pierce the second potting part in the axial direction of the housing, and
   an opening of at least one through hole among the through holes on a surface of the second potting part which faces the first potting part is located in a region which ranges within a height of 3 mm from the lowest portion of said surface.

9. The cartridge type hollow-fiber membrane module according to claim 1, wherein
   the second potting part has one or more through holes which pierce the second potting part in the axial direction of the housing, and
   a sum of a channel area of the through holes and a channel area of the gap between the second potting part and the housing is 5 to 30% of a cross-sectional area of the housing.

10. The cartridge type hollow-fiber membrane module according to claim 1, which is equipped with a flow regulation cylinder below the first potting part, wherein a gap is provided between a lower end of the flow regulation cylinder and the housing.

11. The cartridge type hollow-fiber membrane module according to claim 3, wherein when the second potting part is moved in a direction opposite from the first potting part, the holding part is in line contact with both the first holding groove and the second holding groove to thereby hold the second potting part.

* * * * *